(12) United States Patent
Chang et al.

(10) Patent No.: US 9,715,156 B2
(45) Date of Patent: Jul. 25, 2017

(54) INTERFEROMETRIC MODULATOR MIRROR DESIGN WITHOUT METAL LAYER IN THE HINGE

(71) Applicant: SnapTrack, Inc., San Diego, CA (US)

(72) Inventors: Tallis Young Chang, San Diego, CA (US); Yaoling Pan, San Diego, CA (US); Bing Wen, Poway, CA (US); Edward Keat Leem Chan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 14/662,031

(22) Filed: Mar. 18, 2015

(65) Prior Publication Data

US 2016/0274436 A1    Sep. 22, 2016

(51) Int. Cl.
*G02F 1/21*        (2006.01)
*G02B 26/00*       (2006.01)

(52) U.S. Cl.
CPC .............. *G02F 1/21* (2013.01); *G02B 26/001* (2013.01)

(58) Field of Classification Search
CPC ......... G01J 3/26; G02B 26/001; G02B 26/00; G09G 3/3466; G09G 2320/0693
USPC .................. 345/501, 212, 108; 359/290, 291
See application file for complete search history.

(56) References Cited

U.S. PATENT DOCUMENTS

| | | | |
|---|---|---|---|
| 5,825,528 A | 10/1998 | Goossen | |
| 5,835,255 A | 11/1998 | Miles | |
| 6,950,223 B2 * | 9/2005 | Huibers | G02B 26/0841 257/417 |
| 7,295,363 B2 | 11/2007 | Patel et al. | |
| 8,472,100 B2 | 6/2013 | Oden et al. | |
| 2005/0078348 A1 | 4/2005 | Lin | |
| 2005/0250362 A1 | 11/2005 | Doan et al. | |
| 2009/0251760 A1 | 10/2009 | Pan | |
| 2011/0265564 A1 * | 11/2011 | Acar | G01C 19/5712 73/504.08 |
| 2013/0135335 A1 | 5/2013 | Govil | |
| 2013/0293556 A1 * | 11/2013 | Chan | G01J 3/26 345/501 |
| 2014/0078503 A1 | 3/2014 | Matsushita et al. | |

OTHER PUBLICATIONS

International Search Report and Written Opinion—PCT/US2016/018937—ISA/EPO—Apr. 21, 2016.

* cited by examiner

*Primary Examiner* — Koosha Sharifi-Tafreshi
(74) *Attorney, Agent, or Firm* — Weaver Austin Villeneuve & Sampson LLP

(57) ABSTRACT

Various implementations described herein involve interferometric modulators (IMODs), which may be single-mirror IMODs (SMIs). Such IMODs may include an absorber stack and a mirror stack. The absorber stack and the mirror stack may define a gap therebetween and may be capable of being positioned in a plurality of positions relative to one another to form a plurality of gap heights. A hinge area may physically connect the mirror stack and an anchor area. Some such IMODs have hinge areas without any metal layer. However, the hinge area may be capable of forming an electrical connection with at least one metal layer of the mirror stack. For example, such IMODs may have a hinge area that includes a non-metal conductor.

26 Claims, 14 Drawing Sheets

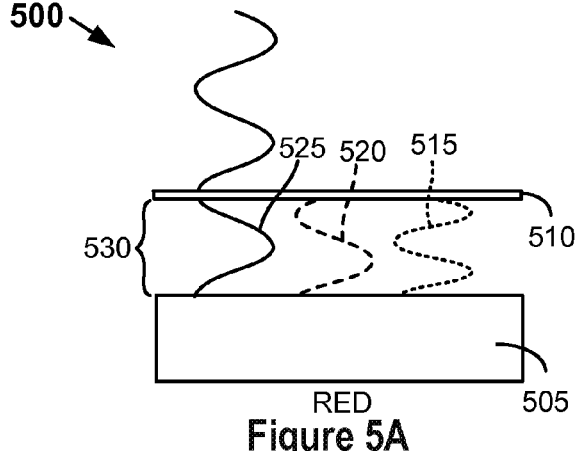
Figure 5A RED
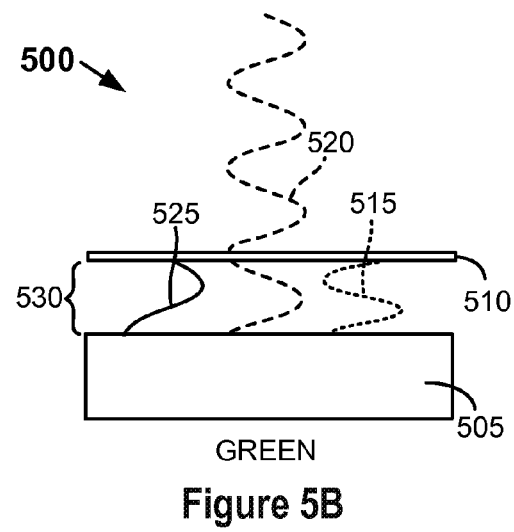
Figure 5B GREEN
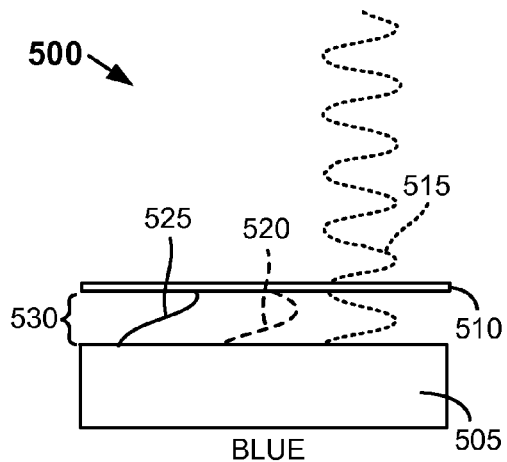
Figure 5C BLUE
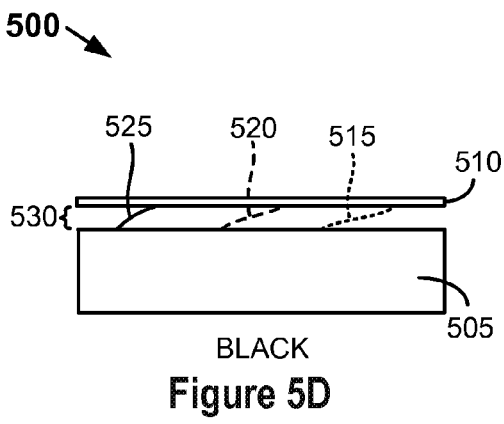
Figure 5D BLACK
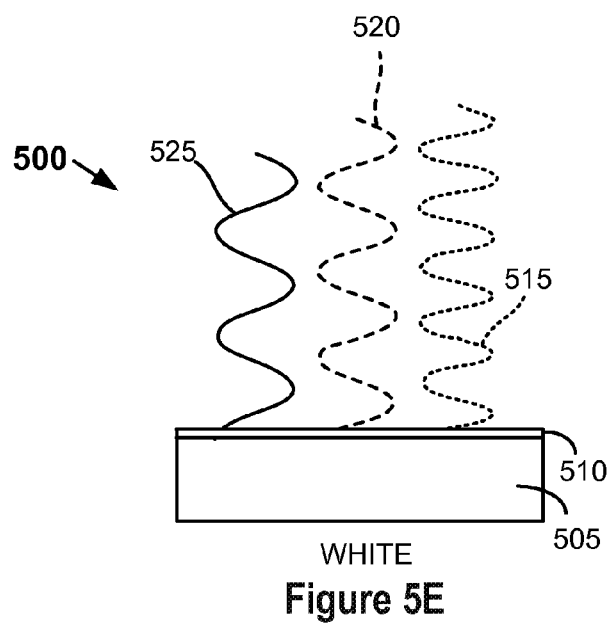
Figure 5E WHITE

INTERFEROMETRIC MODULATOR MIRROR DESIGN WITHOUT METAL LAYER IN THE HINGE

TECHNICAL FIELD

This disclosure relates to electromechanical systems and devices, and more particularly to electromechanical systems for implementing reflective display devices.

DESCRIPTION OF THE RELATED TECHNOLOGY

Electromechanical systems (EMS) include devices having electrical and mechanical elements, actuators, transducers, sensors, optical components such as mirrors and optical films, and electronics. EMS devices or elements can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of EMS device is called an interferometric modulator (IMOD). The term IMOD or interferometric light modulator refers to a device that selectively absorbs and/or reflects light using the principles of optical interferometric absorption. In some implementations, an IMOD display element may include a pair of conductive plates, one of which has a high reflectance and one is partially absorptive. The pair of conductive plates are capable of relative motion upon application of an appropriate electrical signal. For example, one plate may include a stationary layer deposited over, on or supported by a substrate and the other plate may include a partial absorptive membrane separated from the stationary layer by an air gap. The position of one plate in relation to another can change the spectrum of the reflected light from the IMOD display element. IMOD-based display devices have a wide range of applications, and are anticipated to be used in improving existing products and creating new products, especially those with display capabilities.

Some IMODs are bi-stable IMODs, meaning that they can be configured in only two positions, high reflectance and low reflectance. At the high reflectance position, each pixel in a bi-stable IMOD reflects only one color, which may be a primary color. In some implementations, a display including such bi-stable IMODs may incorporate three sub-pixels to display an image pixel. In a display device that includes a single-mirror IMOD (SMI), such as a multi-state interferometric modulator (MS-IMOD) or an analog IMOD (A-IMOD), each pixel can have more than two positions (or gap spacings), and a pixel's reflective color may be determined by the gap spacing or "gap height" between an absorber stack and a mirror stack of a single IMOD. As such, each pixel can reflect multiple colors. Some A-IMODs may be positioned in a substantially continuous manner between a large number of gap heights, whereas MS-IMODs may generally be positioned in a smaller number of gap heights.

SUMMARY

The systems, methods and devices of this disclosure each have several innovative aspects, no single one of which is solely responsible for the desirable attributes disclosed herein.

One innovative aspect of the subject matter described in this disclosure can be implemented in an IMOD. The IMOD may include a mirror stack having a first metal layer and a substrate formed of transparent material, or substantially transparent material. In some examples, the IMOD may include an absorber stack disposed on the substrate, an anchor area including a plurality of anchors, and a hinge area physically connecting the mirror stack and the anchor area. The hinge area may be capable of electrical connectivity with the first metal layer. In some examples, the mirror stack may be capable of being actuated via electrical signals received by the first metal layer via the hinge area. According to some examples, the hinge area may not include a metal layer.

The absorber stack may include an absorber layer. The absorber stack and the mirror stack may define a gap therebetween and may be capable of being positioned in a plurality of positions relative to one another, to form a plurality of gap heights. Each reflective color of a plurality of reflective colors of the IMOD may correspond with a gap height of the plurality of gap heights. In some examples, the plurality of reflective colors may include more than two colors.

In some implementations, the hinge area may include a metal oxide or a metal nitride. According to some examples, the hinge area may include at least one non-metal conductor, such as carbon, indium tin oxide, tantalum nitride, tantalum oxide, titanium oxide, titanium oxynitride or zirconium oxide.

According to some implementations, the mirror stack may include a first dielectric layer proximate the first metal layer and a second dielectric layer proximate the first dielectric layer. The first dielectric layer may have a first index of refraction and the second dielectric layer may have a second index of refraction that is different from (e.g., higher than) the first index of refraction. According to some examples, the first metal layer may be disposed proximate a first side of the mirror stack. According to some such implementations, the mirror stack may include a second metal layer disposed proximate a second side of the mirror stack and a third dielectric layer proximate the second metal layer. In some examples, the third dielectric layer may be formed of the same material as, and may have a thickness substantially equal to that of, the first dielectric layer. According to some such implementations, the mirror stack may include a fourth dielectric layer proximate the third dielectric layer. In some examples, the fourth dielectric layer may be formed of the same material as, and may have a thickness substantially equal to that of, the second dielectric layer.

According to some implementations, the IMOD may include a plurality of protrusions disposed on at least one of the absorber stack or the mirror stack. The protrusions may be capable of preventing contact between areas of the mirror and areas of the absorber stack. In some examples, each of the protrusions may extend between 5 and 20 nm from the surface on which the protrusion is formed.

In some examples, a display device may include the IMOD. The display device may include a control system capable of controlling the display device. The control system may be capable of processing image data. The control system may include a driver circuit capable of sending at least one signal to a display of the display device and a controller capable of sending at least a portion of the image data to the driver circuit. In some examples, the control system may include an image source module capable of sending the image data to the processor. The image source module may include a receiver, a transmitter or a transceiver. The display device may include an input device capable of receiving input data and of communicating the input data to the control system.

According to some implementations, the control system may be capable of controlling each pixel of the display device independently. In some such implementations, the control system may include a plurality of thin-film transistor (TFT) switches. Each of the plurality of TFT switches may correspond to an individual pixel of the display device.

In some examples, the IMOD may include an electrode. The control system may be capable of moving the mirror stack away from the absorber stack by applying a voltage between the electrode and the mirror stack.

Other innovative aspects of the subject matter described in this disclosure can be implemented in a method that involves forming an absorber stack, including an absorber layer, on a substrate. In some examples, the method may involve forming a sacrificial layer on the absorber stack and forming an anchor area, including a plurality of anchors, on portions of the absorber stack. The method may involve forming a mirror stack, including a first metal layer, on a mirror stack area of the sacrificial layer. The mirror stack area may be within the anchor area. The method may involve forming a hinge area on the anchor area to physically connect the mirror stack and the anchor area. In some examples, forming the hinge area may involve forming at least one layer that is capable of electrical connectivity with the first metal layer. According to some implementations, forming the hinge area may involve forming no metal layer in the hinge area. In some examples, the method may involve releasing the sacrificial layer to form a gap between the absorber stack and the mirror stack.

According to some implementations, the method may involve configuring the absorber stack and the mirror stack to be capable of being positioned in a plurality of positions relative to one another, to form a plurality of gap heights. Each reflective color of a plurality of reflective colors of the IMOD may correspond with a gap height of the plurality of gap heights. In some examples, the configuring process may involve configuring the absorber stack and the mirror stack to be capable of being positioned in a plurality of positions relative to one another via movement of the mirror stack relative to the hinge area.

In some implementations, forming the hinge area may involve depositing at least one material selected from a list of materials consisting of dielectrics, semiconductors and carbon. In some examples, forming the hinge area may involve depositing at least one non-metal conductor, such as carbon, indium tin oxide, tantalum nitride, tantalum oxide, titanium oxide, titanium oxynitride and zirconium oxide.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIGS. 5A-5E show examples of how an IMOD may be configured to produce different colors.

Like reference numbers and designations in the various drawings indicate like elements.

DETAILED DESCRIPTION

Figure 1:
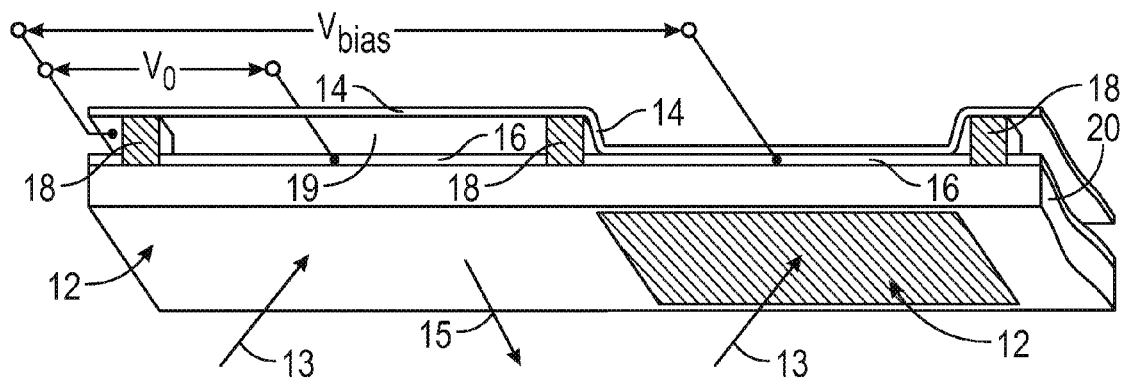
FIG. 1 is an isometric view illustration depicting two adjacent interferometric modulator (IMOD) display elements in a series or array of display elements of an IMOD display device.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system that can be configured to display an image, whether in motion (such as video) or stationary (such as still images), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Various implementations described herein include IMODs having a hinge area that physically connects a mirror stack and an anchor area. Some such IMODs have hinge areas without any metal layer. However, the hinge area may nonetheless be capable of forming an electrical connection with at least one metal layer of the mirror stack. For example, such IMODs may have a hinge area that includes a non-metal conductor or semiconductor.

Particular implementations of the subject matter described in this disclosure can be implemented to realize one or more of the following potential advantages. Some implementations may provide hinge areas that do not suffer from metal creep or similar types of fatigue experienced by metals. Display devices including such IMODs may be relatively less susceptible to "burn-in" than prior IMOD-based display devices.

An example of a suitable EMS or MEMS device or apparatus, to which the described implementations may apply, is a reflective display device. Reflective display devices can incorporate interferometric modulator (IMOD) display elements that can be implemented to selectively absorb and/or reflect light incident thereon using principles of optical interference. IMOD display elements can include a partial optical absorber, a reflector that is movable with respect to the absorber, and an optical resonant cavity defined between the absorber and the reflector. In some implementations, the reflector can be moved to two or more different positions, which can change the size of the optical resonant cavity and thereby affect the reflectance of the IMOD. The reflectance spectra of IMOD display elements can create fairly broad spectral bands that can be shifted across the visible wavelengths to generate different colors. The position of the spectral band can be adjusted by changing the thickness of the optical resonant cavity. One way of changing the optical resonant cavity is by changing the position of the reflector with respect to the absorber.

FIG. 1 is an isometric view illustration depicting two adjacent interferometric modulator (IMOD) display elements in a series or array of display elements of an IMOD display device. The IMOD display device includes one or more interferometric EMS, such as MEMS, display elements. In these devices, the interferometric MEMS display elements can be configured in either a bright or dark state. In the bright ("relaxed," "open" or "on," etc.) state, the display element reflects a large portion of incident visible light. Conversely, in the dark ("actuated," "closed" or "off," etc.) state, the display element reflects little incident visible light. MEMS display elements can be configured to reflect predominantly at particular wavelengths of light allowing for a color display in addition to black and white. In some implementations, by using multiple display elements, different intensities of color primaries and shades of gray can be achieved.

The IMOD display device can include an array of IMOD display elements which may be arranged in rows and columns. Each display element in the array can include at least a pair of reflective and semi-reflective layers, such as a movable reflective layer (i.e., a movable layer, also referred to as a mechanical layer) and a fixed partially reflective layer (i.e., a stationary layer), positioned at a variable and controllable distance from each other to form an air gap (also referred to as an optical gap, cavity or optical resonant cavity). The movable reflective layer may be moved between at least two positions. For example, in a first position, i.e., a relaxed position, the movable reflective layer can be positioned at a distance from the fixed partially reflective layer. In a second position, i.e., an actuated position, the movable reflective layer can be positioned more closely to the partially reflective layer. Incident light that reflects from the two layers can interfere constructively and/or destructively depending on the position of the movable reflective layer and the wavelength(s) of the incident light, producing either an overall reflective or non-reflective state for each display element. In some implementations, the display element may be in a reflective state when unactuated, reflecting light within the visible spectrum, and may be in a dark state when actuated, absorbing and/or destructively interfering light within the visible range. In some other implementations, however, an IMOD display element may be in a dark state when unactuated, and in a reflective state when actuated. In some implementations, the introduction of an applied voltage can drive the display elements to change states. In some other implementations, an applied charge can drive the display elements to change states.

The depicted portion of the array in FIG. 1 includes two adjacent interferometric MEMS display elements in the form of IMOD display elements 12. In the display element 12 on the right (as illustrated), the movable reflective layer 14 is illustrated in an actuated position near, adjacent or touching the optical stack 16. The voltage $V_{bias}$ applied across the display element 12 on the right is sufficient to move and also maintain the movable reflective layer 14 in the actuated position. In the display element 12 on the left (as illustrated), a movable reflective layer 14 is illustrated in a relaxed position at a distance (which may be predetermined based on design parameters) from an optical stack 16, which includes a partially reflective layer. The voltage $V_0$ applied across the display element 12 on the left is insufficient to cause actuation of the movable reflective layer 14 to an actuated position such as that of the display element 12 on the right.

In FIG. 1, the reflective properties of IMOD display elements 12 are generally illustrated with arrows indicating light 13 incident upon the IMOD display elements 12, and light 15 reflecting from the display element 12 on the left. Most of the light 13 incident upon the display elements 12 may be transmitted through the transparent substrate 20, toward the optical stack 16. A portion of the light incident upon the optical stack 16 may be transmitted through the partially reflective layer of the optical stack 16, and a portion will be reflected back through the transparent substrate 20. The portion of light 13 that is transmitted through the optical stack 16 may be reflected from the movable reflective layer 14, back toward (and through) the transparent substrate 20. Interference (constructive and/or destructive) between the light reflected from the partially reflective layer of the optical stack 16 and the light reflected from the movable reflective layer 14 will determine in part the intensity of wavelength(s) of light 15 reflected from the display element 12 on the viewing or substrate side of the device. In some implementations, the transparent substrate 20 can be a glass substrate (sometimes referred to as a glass plate or panel). The glass substrate may be or include, for example, a borosilicate glass, a soda lime glass, quartz, Pyrex, or other suitable glass material. In some implementations, the glass substrate may have a thickness of 0.3, 0.5 or 0.7 millimeters, although in some implementations the glass substrate can be thicker (such as tens of millimeters) or thinner (such as less than 0.3 millimeters). In some implementations, a non-glass substrate can be used, such as a polycarbonate, acrylic, polyethylene terephthalate (PET) or polyether ether ketone (PEEK) substrate. In such an implementation, the non-glass substrate will likely have a thickness of less than 0.7 millimeters, although the substrate may be thicker depending on the design considerations. In some implementations, a non-transparent substrate, such as a metal foil or stainless steel-based substrate can be used. For example, a reverse-IMOD-based display, which includes a fixed reflective layer and a movable layer which is partially transmissive and partially reflective, may be configured to be viewed from the opposite side of a substrate as the display elements 12 of FIG. 1 and may be supported by a non-transparent substrate.

The optical stack 16 can include a single layer or several layers. The layer(s) can include one or more of an electrode layer, a partially reflective and partially transmissive layer, and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals (e.g., chromium and/or molybdenum), semiconductors, and dielectrics. The partially reflective layer can be formed of one or more layers of materials, and each of the layers can be formed of a single material or a combination of materials. In some implementations, certain portions of the optical stack 16 can include a single semi-transparent thickness of metal or semiconductor which serves as both a partial optical absorber and electrical conductor, while different, electrically more conductive layers or portions (e.g., of the optical stack 16 or of other structures of the display element) can serve to bus signals between IMOD display elements. The optical stack 16 also can include one or more insulating or dielectric layers covering one or more conductive layers or an electrically conductive/partially absorptive layer.

In some implementations, at least some of the layer(s) of the optical stack 16 can be patterned into parallel strips, and may form row electrodes in a display device as described further below. As will be understood by one having ordinary skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of supports, such as the illustrated posts 18, and an intervening sacrificial material located between the posts 18. When the sacrificial material is etched away, a defined gap 19, or optical cavity, can be formed between the movable reflective layer 14 and the optical stack 16. In some implementations, the spacing between posts 18 may be approximately 1-1000 µm, while the gap 19 may be approximately less than 10,000 Angstroms (Å).

In some implementations, each IMOD display element, whether in the actuated or relaxed state, can be considered as a capacitor formed by the fixed and moving reflective layers. When no voltage is applied, the movable reflective layer 14 remains in a mechanically relaxed state, as illustrated by the display element 12 on the left in FIG. 1, with the gap 19 between the movable reflective layer 14 and optical stack 16. However, when a potential difference, i.e., a voltage, is applied to at least one of a selected row and column, the capacitor formed at the intersection of the row and column electrodes at the corresponding display element becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated display element 12 on the right in FIG. 1. The behavior can be the same regardless of the polarity of the applied potential difference. Though a series of display elements in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. In some implementations, the rows may be referred to as "common" lines and the columns may be referred to as "segment" lines, or vice versa. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
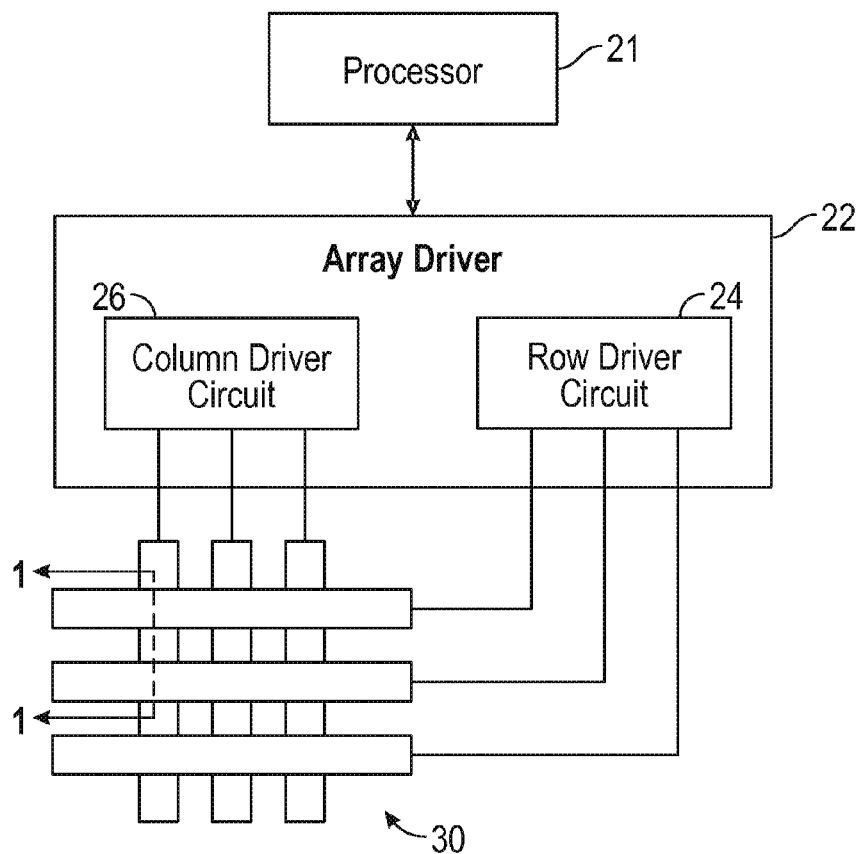
FIG. 2 is a system block diagram illustrating an electronic device incorporating an IMOD-based display including a three element by three element array of IMOD display elements.

FIG. 2 is a system block diagram illustrating an electronic device incorporating an IMOD-based display including a three element by three element array of IMOD display elements. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, for example a display array or panel 30. The cross section of the IMOD display device illustrated in FIG. 1 is shown by the lines 1-1 in FIG. 2. Although FIG. 2 illustrates a 3×3 array of IMOD display elements for the sake of clarity, the display array 30 may contain a very large number of IMOD display elements, and may have a different number of IMOD display elements in rows than in columns, and vice versa.

Figure 3:
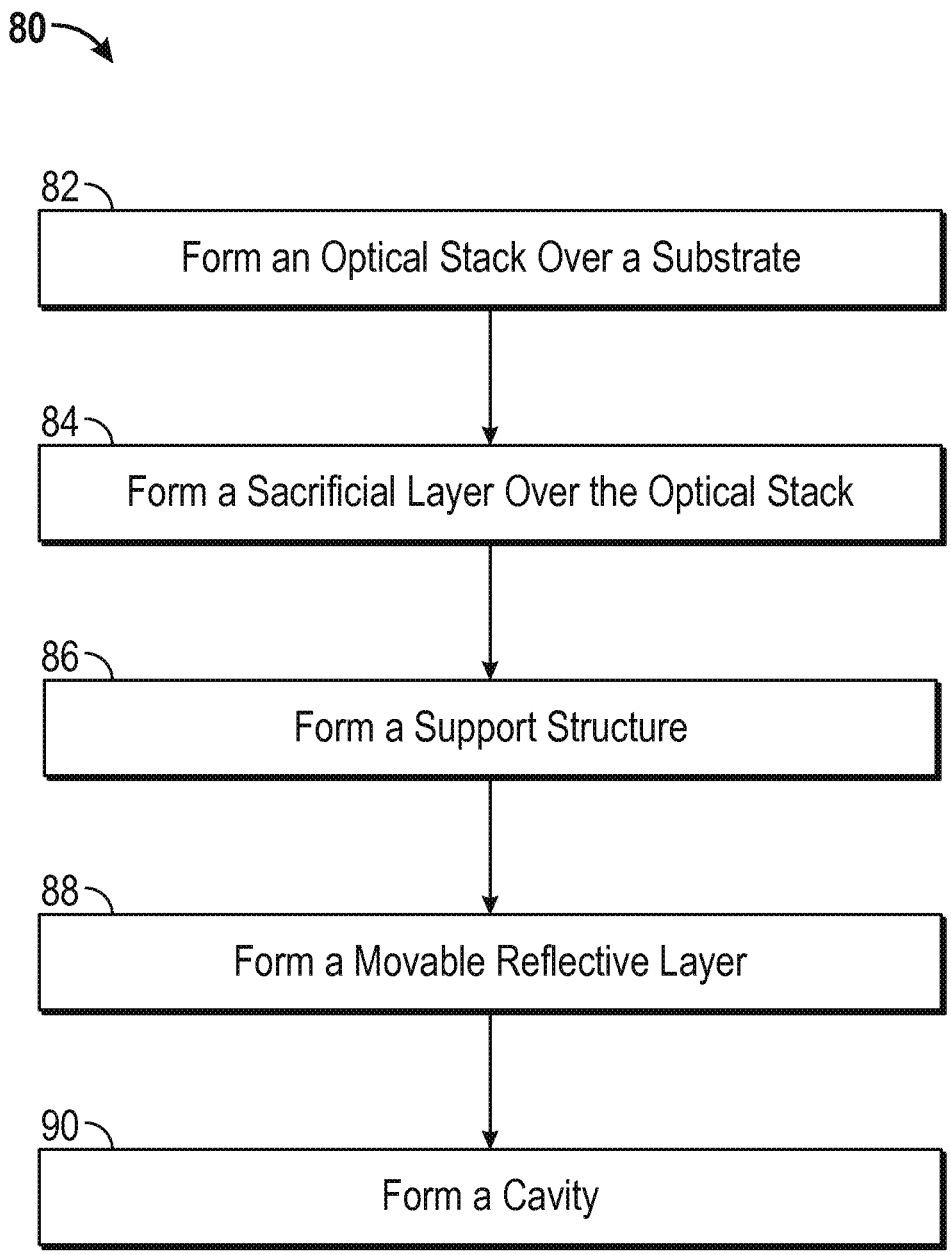
FIG. 3 is a flow diagram illustrating a manufacturing process for an IMOD display or display element.
Figure 4A:
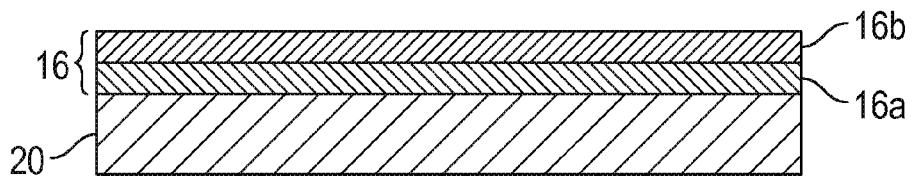
FIGS. 4A-4E are cross-sectional illustrations of various stages in a process of making an IMOD display or display element.

FIG. 3 is a flow diagram illustrating a manufacturing process 80 for an IMOD display or display element. FIGS. 4A-4E are cross-sectional illustrations of various stages in the manufacturing process 80 for making an IMOD display or display element. In some implementations, the manufacturing process 80 can be implemented to manufacture one or more EMS devices, such as IMOD displays or display elements. The manufacture of such an EMS device also can include other blocks not shown in FIG. 3. The process 80 begins at block 82 with the formation of the optical stack 16 over the substrate 20. FIG. 4A illustrates such an optical stack 16 formed over the substrate 20. The substrate 20 may be a transparent substrate such as glass or plastic such as the materials discussed above with respect to FIG. 1. The substrate 20 may be flexible or relatively stiff and unbending, and may have been subjected to prior preparation processes, such as cleaning, to facilitate efficient formation of the optical stack 16. As discussed above, the optical stack 16 can be electrically conductive, partially transparent, partially reflective, and partially absorptive, and may be fabricated, for example, by depositing one or more layers having the desired properties onto the transparent substrate 20.

In FIG. 4A, the optical stack 16 includes a multilayer structure having sub-layers 16a and 16b, although more or fewer sub-layers may be included in some other implementations. In some implementations, one of the sub-layers 16a and 16b can be configured with both optically absorptive and electrically conductive properties, such as the combined conductor/absorber sub-layer 16a. In some implementations, one of the sub-layers 16a and 16b can include molybdenum-chromium (molychrome or MoCr), or other materials with a suitable complex refractive index. Additionally, one or more of the sub-layers 16a and 16b can be patterned into parallel strips, and may form row electrodes in a display device. Such patterning can be performed by a masking and etching process or another suitable process known in the art. In some implementations, one of the sub-layers 16a and 16b can be an insulating or dielectric layer, such as an upper sub-layer 16b that is deposited over one or more underlying metal and/or oxide layers (such as one or more reflective and/or conductive layers). In addition, the optical stack 16 can be patterned into individual and parallel strips that form the rows of the display. In some implementations, at least one of the sub-layers of the optical stack, such as the optically absorptive layer, may be quite thin (e.g., relative to other layers depicted in this disclosure), even though the sub-layers 16a and 16b are shown somewhat thick in FIGS. 4A-4E.

Figure 4B:
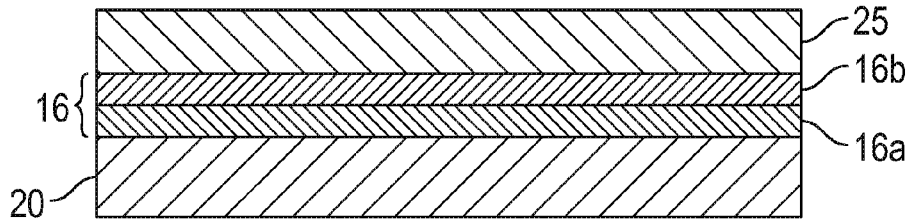

The process 80 continues at block 84 with the formation of a sacrificial layer 25 over the optical stack 16. Because the sacrificial layer 25 is later removed (see block 90) to form the cavity 19, the sacrificial layer 25 is not shown in the resulting IMOD display elements. FIG. 4B illustrates a partially fabricated device including a sacrificial layer 25 formed over the optical stack 16. The formation of the sacrificial layer 25 over the optical stack 16 may include deposition of a xenon difluoride ($XeF_2$)-etchable material such as molybdenum (Mo) or amorphous silicon (Si), in a thickness selected to provide, after subsequent removal, a gap or cavity 19 (see also FIG. 4E) having a desired design size. Deposition of the sacrificial material may be carried out using deposition techniques such as physical vapor deposition (PVD, which includes many different techniques, such as sputtering), plasma-enhanced chemical vapor deposition (PECVD), thermal chemical vapor deposition (thermal CVD), or spin-coating.

Figure 4C:
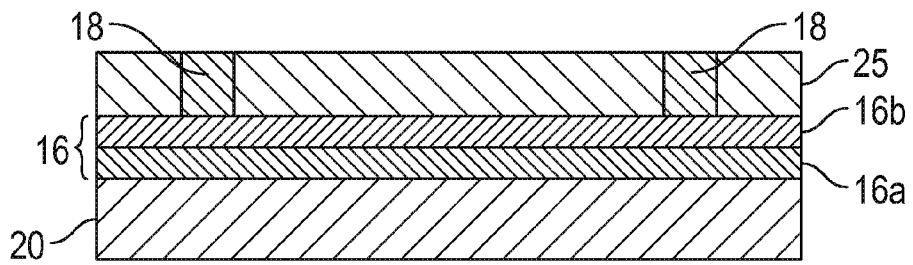
Figure 4D:
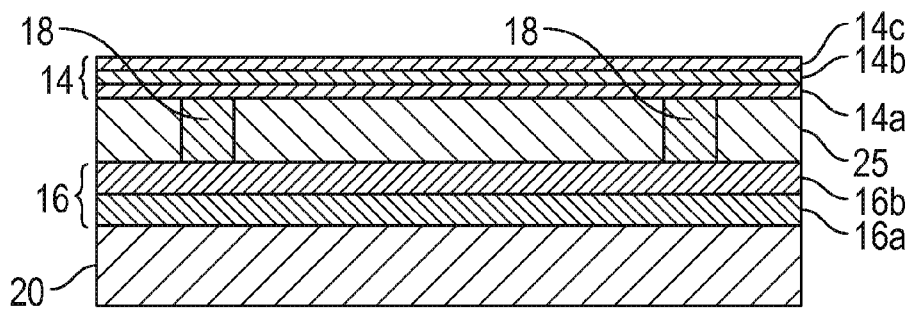
Figure 4E:
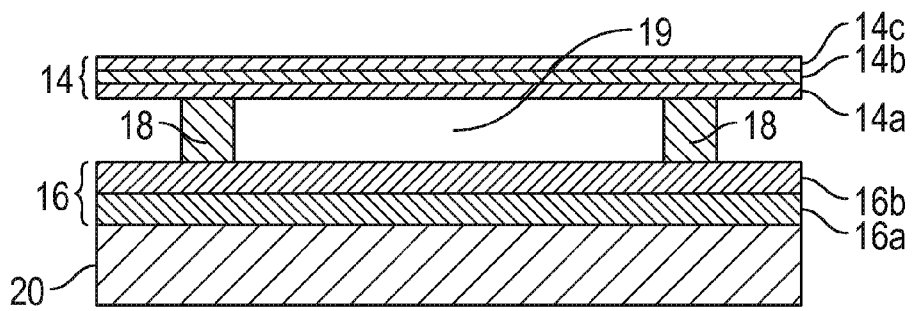

The process 80 continues at block 86 with the formation of a support structure such as a support post 18. The formation of the support post 18 may include patterning the sacrificial layer 25 to form a support structure aperture, then depositing a material (such as a polymer or an inorganic material, like silicon oxide) into the aperture to form the support post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the support post 18 contacts the substrate 20. Alternatively, as depicted in FIG. 4C, the aperture formed in the sacrificial layer 25 can extend through the sacrificial layer 25, but not through the optical stack 16. For example, FIG. 4E illustrates the lower ends of the support posts 18 in contact with an upper surface of the optical stack 16. The support post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 4C, but also can extend at least partially over a portion of the sacrificial layer 25. As noted above, the patterning of the sacrificial layer 25 and/or the support posts 18 can be performed by a masking and etching process, but also may be performed by alternative patterning methods.

The process 80 continues at block 88 with the formation of a movable reflective layer or membrane such as the movable reflective layer 14 illustrated in FIG. 4A. The movable reflective layer 14 may be formed by employing one or more deposition steps, including, for example, reflective layer (such as aluminum, aluminum alloy, or other reflective materials) deposition, along with one or more patterning, masking and/or etching steps. The movable reflective layer 14 can be patterned into individual and parallel strips that form, for example, the columns of the display. The movable reflective layer 14 can be electrically conductive, and referred to as an electrically conductive layer. In some implementations, the movable reflective layer 14 may include a plurality of sub-layers 14a, 14b and 14c as shown in FIG. 4D. In some implementations, one or more of the sub-layers, such as sub-layers 14a and 14c, may include highly reflective sub-layers selected for their optical properties, and another sub-layer 14b may include a mechanical sub-layer selected for its mechanical properties. In some implementations, the mechanical sub-layer may include a dielectric material. Since the sacrificial layer 25 is still present in the partially fabricated IMOD display element formed at block 88, the movable reflective layer 14 is typically not movable at this stage. A partially fabricated IMOD display element that contains a sacrificial layer 25 also may be referred to herein as an "unreleased" IMOD.

The process 80 continues at block 90 with the formation of a cavity 19. The cavity 19 may be formed by exposing the sacrificial material 25 (deposited at block 84) to an etchant. For example, an etchable sacrificial material such as Mo or amorphous Si may be removed by dry chemical etching by exposing the sacrificial layer 25 to a gaseous or vaporous etchant, such as vapors derived from solid $XeF_2$ for a period of time that is effective to remove the desired amount of material. The sacrificial material is typically selectively removed relative to the structures surrounding the cavity 19. Other etching methods, such as wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD display element may be referred to herein as a "released" IMOD.

In some implementations, the packaging of an EMS component or device, such as an IMOD-based display, can include a backplate (alternatively referred to as a backplane, back glass or recessed glass) which can be configured to protect the EMS components from damage (such as from mechanical interference or potentially damaging substances). The backplate also can provide structural support for a wide range of components, including but not limited to driver circuitry, processors, memory, interconnect arrays, vapor barriers, product housing, and the like. In some implementations, the use of a backplate can facilitate integration of components and thereby reduce the volume, weight, and/or manufacturing costs of a portable electronic device.

FIGS. 5A-5E show examples of how a single IMOD (IMOD) may be configured to produce different colors. Alternative implementations, in which similar configurations of the IMOD produce colors different from those described with reference to FIGS. 5A-5E, are described in detail below. Single-mirror IMODs (SMIs), such as multistate IMODs (MS-IMODs) and analog IMODs (A-IMODs) are considered to be examples of the broader class of IMODs.

In an SMI, a pixel's reflective color may be varied by changing the gap height between an absorber stack and a mirror stack. In FIGS. 5A-5E, the IMOD 500 includes the mirror stack 505 and the absorber stack 510. In this implementation, the absorber stack 510 is partially reflective and partially absorptive. Here, the mirror stack 505 includes at least one metallic reflective layer, which also may be referred to herein as a mirrored surface or a metal mirror.

In FIGS. 5A-5E, the mirror stack 505 is shown at five positions relative to the absorber stack 510. However, an IMOD 500 may be movable between substantially more than 5 positions relative to the mirror stack 505. For example, in some A-IMOD implementations, the gap height 530 between the mirror stack 505 and the absorber stack 510 may be varied in a substantially continuous manner. In some such IMODs 500, the gap height 530 may be controlled with a high level of precision, e.g., with an error of 10 nanometers (nm) or less. Although the absorber stack 510 includes a single absorber layer in this example, alternative implementations of the absorber stack 510 may include multiple absorber layers. Moreover, in alternative implementations, the absorber stack 510 may not be partially reflective.

An incident wave having a wavelength λ will interfere with its own reflection from the mirror stack 505 to create a standing wave with local peaks and nulls. The first null is λ/2 from the mirror and subsequent nulls are located at λ/2 intervals. For that wavelength, a thin absorber layer placed at one of the null positions will absorb very little energy.

Referring first to FIG. 5A, when the gap height 530 is substantially equal to the half wavelength of a red wavelength of light 525 (also referred to herein as a red color), the absorber stack 510 is positioned at the null of the red standing wave interference pattern. The absorption of the red wavelength of light 525 is near zero because there is almost no red light at the absorber. At this configuration, constructive interference appears between red wavelengths of light reflected from the absorber stack 510 and red wavelengths of light reflected from the mirror stack 505. Therefore, light having a wavelength substantially corresponding to the red wavelength of light 525 is reflected efficiently. Light of other colors, including the blue wavelength of light 515 and the green wavelength of light 520, has a high intensity field at the absorber and is not reinforced by constructive interference. Instead, such light is substantially absorbed by the absorber stack 510.

FIG. 5B depicts the IMOD 500 in a configuration wherein the mirror stack 505 is moved closer to the absorber stack 510 (or vice versa). In this example, the gap height 530 is substantially equal to the half wavelength of the green wavelength of light 520. The absorber stack 510 is positioned at the null of the green standing wave interference pattern. The absorption of the green wavelength of light 520 is near zero because there is almost no green light at the absorber. At this configuration, constructive interference appears between green light reflected from the absorber stack 510 and green light reflected from the mirror stack 505. Light having a wavelength substantially corresponding to the green wavelength of light 520 is reflected efficiently. Light of other colors, including the red wavelength of light 525 and the blue wavelength of light 515, is substantially absorbed by the absorber stack 510.

In FIG. 5C, the mirror stack 505 is moved closer to the absorber stack 510 (or vice versa), so that the gap height 530 is substantially equal to the half wavelength of the blue wavelength of light 515. Light having a wavelength substantially corresponding to the blue wavelength of light 515 is reflected efficiently. Light of other colors, including the red wavelength of light 525 and the green wavelength of light 520, is substantially absorbed by the absorber stack 510.

In FIG. 5D, however, the IMOD 500 is in a configuration wherein the gap height 530 is substantially equal to ¼ of the wavelength of the average color in the visible range. In such arrangement, the absorber is located near the intensity peak of the interference standing wave; the strong absorption due to high field intensity together with destructive interference between the absorber stack 510 and the mirror stack 505 causes relatively little visible light to be reflected from the IMOD 500. This configuration may be referred to herein as a "black state." In some such implementations, the gap height 530 may be made larger or smaller than shown in FIG. 5D, in order to reinforce other wavelengths that are outside the visible range. Accordingly, the configuration of the IMOD 500 shown in FIG. 5D provides merely one example of a black state configuration of the IMOD 500.

FIG. 5E depicts the IMOD 500 in a configuration wherein the absorber stack 510 is in close proximity to the mirror stack 505. In this example, the gap height 530 is negligible because the absorber stack 510 is substantially adjacent to the mirror stack 505. Light having a broad range of wavelengths is reflected efficiently from the mirror stack 505 without being absorbed to a significant degree by the absorber stack 510. This configuration may be referred to herein as a "white state." However, in some implementations the absorber stack 510 and the mirror stack 505 may be separated to reduce stiction caused by charging via the strong electric field that may be produced when the two layers are brought close to one another. In some implementations, one or more dielectric layers with a total thickness of about λ/2 may be disposed on the surface of the absorber layer and/or the mirrored surface. As such, the white state may correspond to a configuration wherein the absorber layer is placed at the first null of the standing wave from the mirrored surface of the mirror stack 505.

Figure 6A:
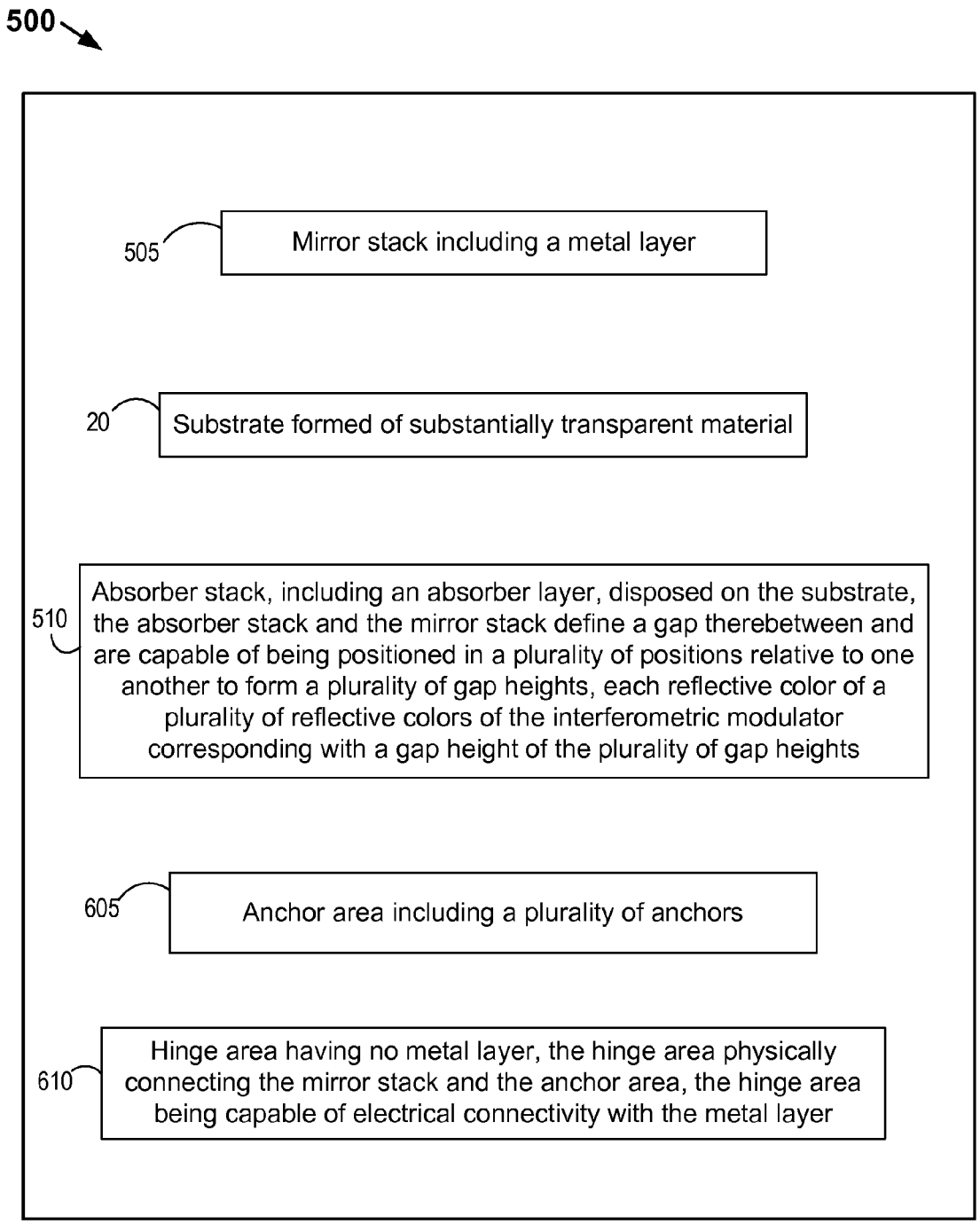
FIG. 6A is a block diagram that shows examples of IMOD elements.

FIG. 6A is a block diagram that shows examples of IMOD elements. In this example, the IMOD 500 includes a mirror stack 505 that has a first metal layer. Here, the IMOD 500 includes a substrate 20, which is formed of transparent or substantially transparent material in this example. In this implementation, the IMOD 500 includes an absorber stack 510, including an absorber layer, disposed on the substrate 20. Here, the absorber stack 510 and the mirror stack 505 are capable of being positioned in a plurality of positions relative to one another to form a plurality of gap distances. Each reflective color of a plurality of reflective colors of the IMOD 500 corresponds with a distinct gap distance.

In this example, the IMOD 500 includes an anchor area having a plurality of anchors. The anchors may, for example, be formed on the absorber stack 510 and/or on the substrate 20. In this implementation, the IMOD 500 also includes a hinge area 610. Here, the hinge area 610 physically connects the mirror stack and the anchor area. In this example, the hinge area 610 has no metal layer, but is capable of electrical connectivity with the first metal layer of the mirror stack 505.

Figure 6B:
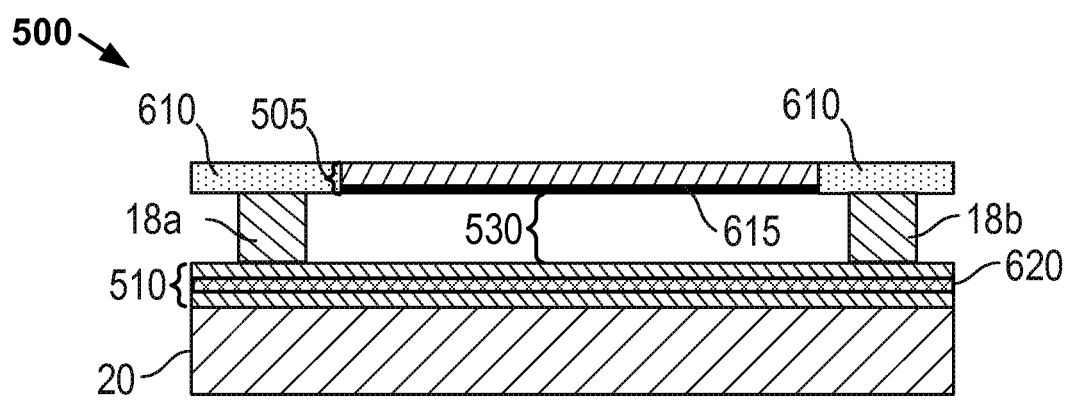
FIG. 6B shows an example of a cross-section through an IMOD such as that of FIG. 6A.

FIG. 6B shows an example of a cross-section through an IMOD such as that of FIG. 6A. The types, arrangements and thicknesses of materials shown in the IMODs of this disclosure, including those shown in FIG. 6B, are merely made by way of example. In this example, an absorber stack 510, including an absorber layer 620, has been formed on the substrate 20. In some implementations, the absorber layer 620 may include a partially absorptive and partially reflective layer. The absorber stack 510 may include other layers, such as one or more dielectric layers. According to some such implementations, the absorber stack may include at least one dielectric layer, a metal layer and a passivation layer. In some implementations, the dielectric layer(s) may include $SiO_2$, SiON, $MgF_2$, $Al_2O_3$ and/or other dielectric materials. In some implementations, the metal layer may include Cr, W, Ni, V, Ti, Rh, Pt, Ge, Co and/or MoCr. In some implementations, the passivation layer may include $Al_2O_3$ or another dielectric material.

In this implementation, the absorber stack 510 has been formed on a substrate 20 that may be transparent or substantially transparent. In this example, the substrate 20 is formed of glass. However, in other implementations the substrate 20 may include one or more other substantially transparent materials, such as plastic, a polymer, quartz, or flexible substrates, etc.

In this example, the IMOD 500 includes anchors 18a and 18b, which are disposed on the absorber stack 510. Anchors may be referred to as "posts" elsewhere herein. The anchors 18a and 18b support the hinge area(s) 610 and the mirror stack 505. In this implementation, the anchors 18a and 18b correspond with anchor areas 605a and 605b, or 605c and 605d, shown in FIGS. 7 and 8.

Figure 9:
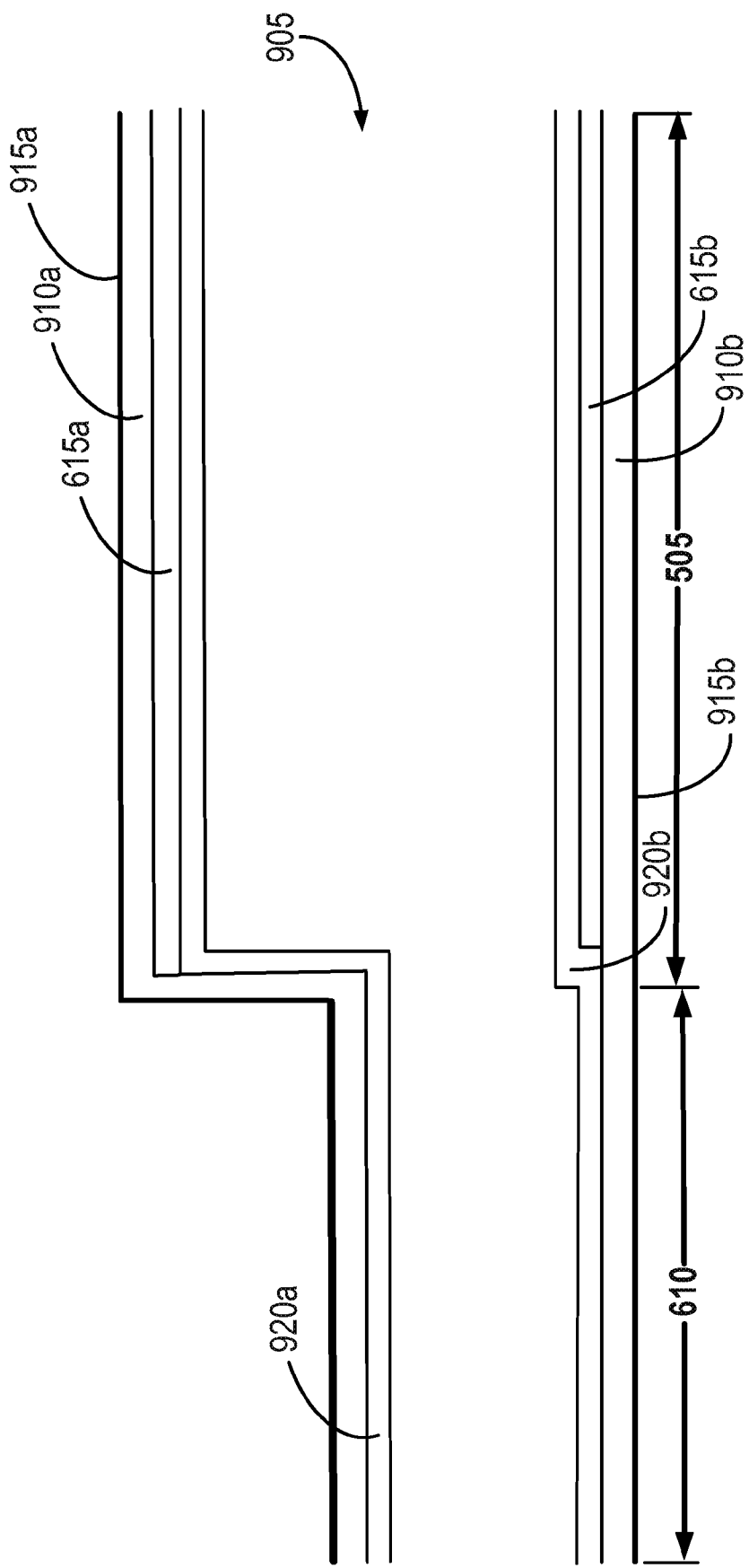
FIG. 9 shows an example of a cross-section through portions of a hinge area and a mirror stack.

In this implementation, the mirror stack 505 includes a metal layer 615, which is conductive and reflective. In some examples, the metal layer 615 may include AlCu, Al, AlNd, AlSc, AlZr, silver, etc. In this example, mirror stack 505 includes one or more other layers, such as one or more dielectric layers. Such dielectric layers may include $TiO_2$, $Si_3N_4$, $ZrO_2$, $Ta_2O_5$, $Sb_2O_3$, $HfO_2$, $Sc_2O_3$, $In_2O_3$, $Sn:In_2O_3$, $SiO_2$, SiON, $MgF_2$, $Al_2O_3$, $HfF_4$, $YbF_3$, $Na_3AlF_6$ and/or other dielectric materials. In some implementations, some of these dielectric layers may be disposed on a side of the metal layer 615 that is facing the absorber stack 510. Some implementations of the IMOD 500 may include a non-metal mirror. In some implementations, the metal layer 615 may be formed on a stiff mechanical layer, which may not provide any optical function and may not require a precise thickness control. Some implementations of the mirror stack 505 may include more than one metal layer, e.g., as shown in FIG. 9.

Figure 7:
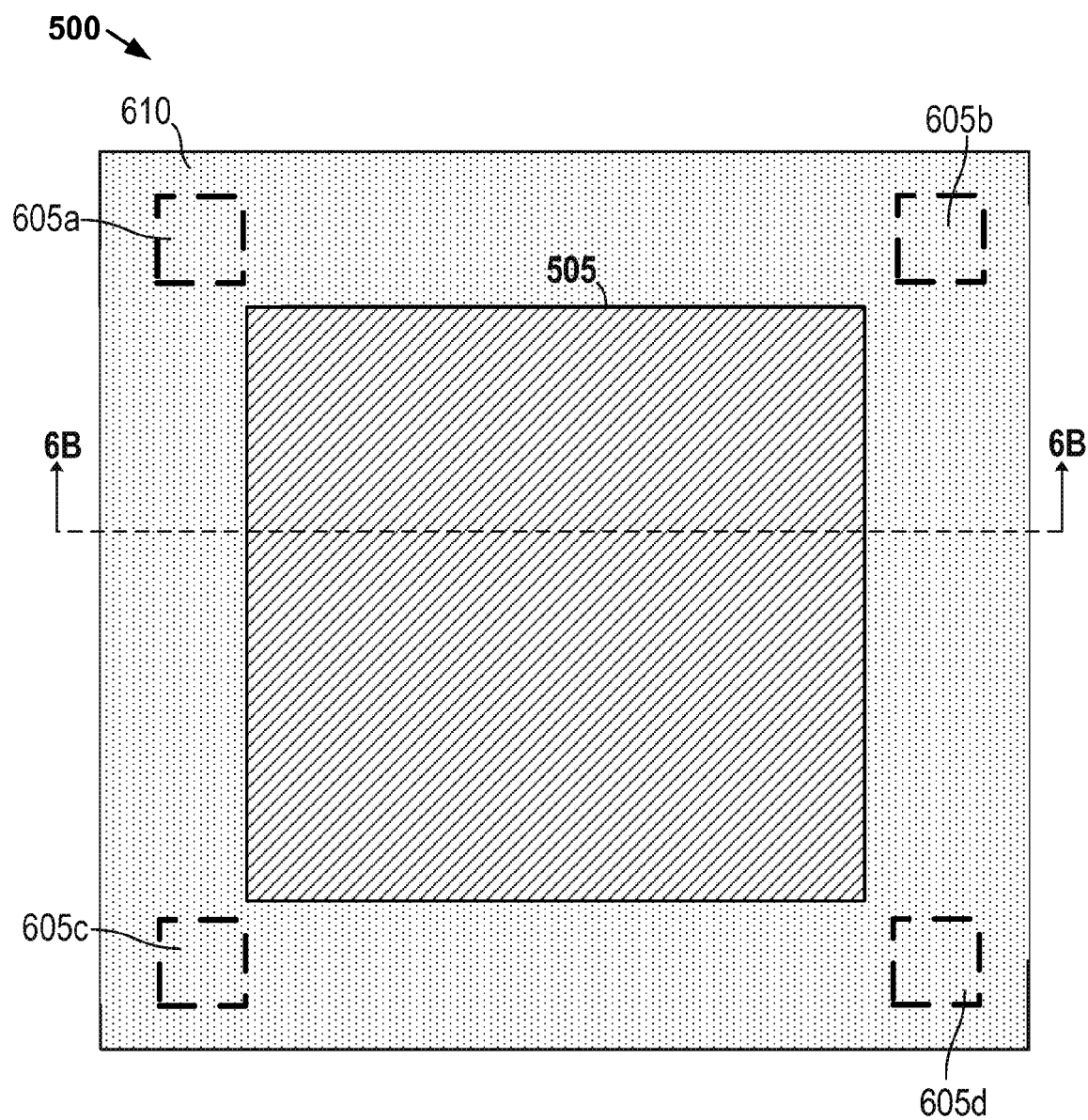
FIG. 7 shows an example of a top view of an IMOD such as that of FIG. 6B.
Figure 8:
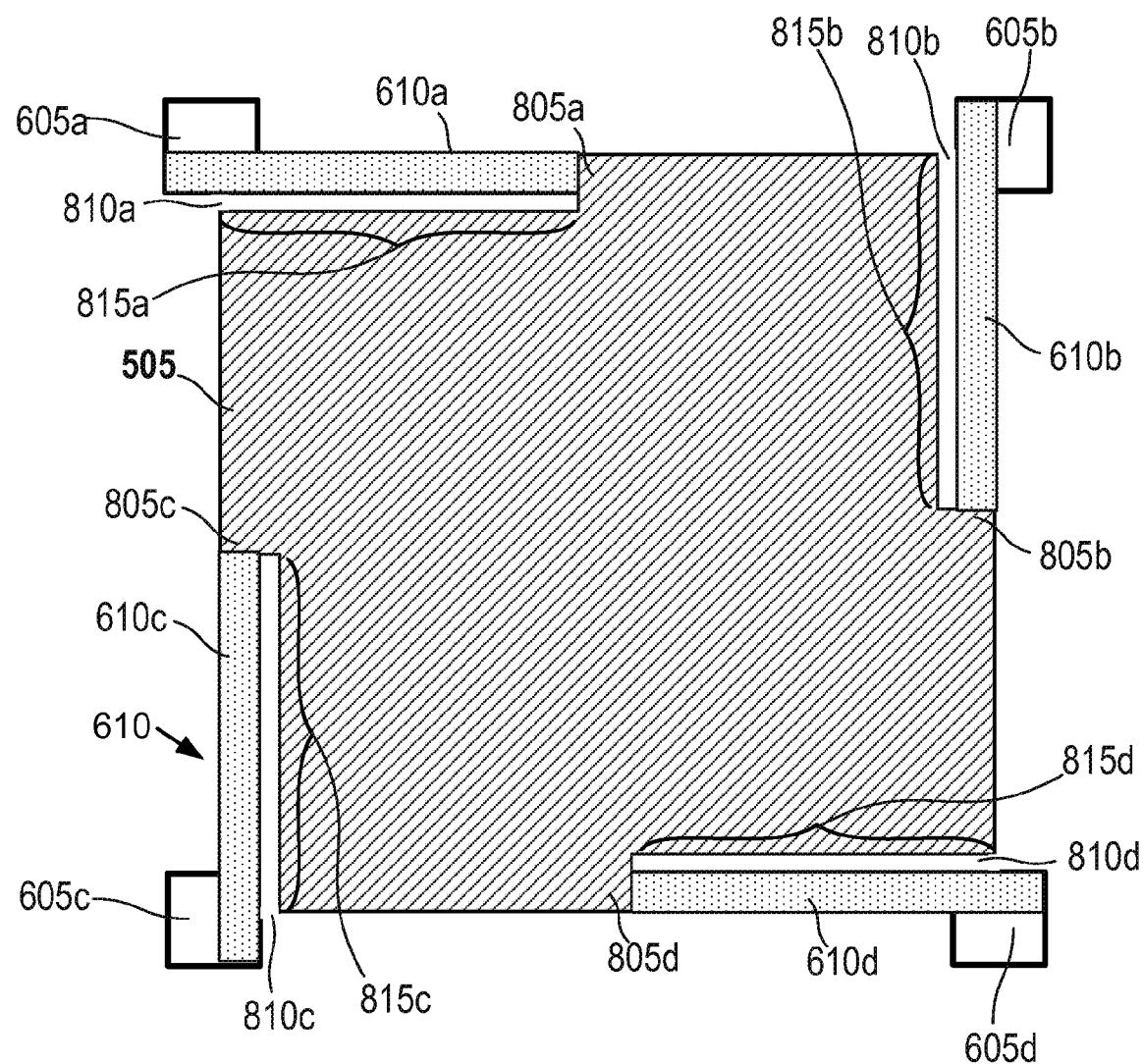
FIG. 8 shows an example of a top view of an alternative IMOD configuration.

As shown more clearly in FIGS. 7 and 8, the hinge area(s) 610 may include a plurality of separate hinge areas or may be a continuous hinge area. Here, the hinge area(s) 610 physically connect the mirror stack 505 and the anchor area. In this implementation, the hinge area or areas 610 include no metal layer, but are capable of electrical connectivity with the metal layer 615. In some examples, the hinge area(s) 610 may include one or more non-metal conductors, such as one or more dielectrics, semiconductors and/or carbon. The dielectrics may include metal oxides, metal nitrides and/or metal oxynitrides. In some implementations, the hinge area(s) 610 may include a non-metal conductor such as indium tin oxide, tantalum nitride, tantalum oxide, titanium oxide, titanium oxynitride, zirconium oxide and/or one or more semiconductors. The semiconductor or conductor layers defined in this application may have properties such as tunable low stress, amorphous or fine grain structures, being thermally stable in terms of both mechanical and electrical performances, process compatibility with existing IMODs and thin-film transistors (TFTs), or general semiconductor processes. The hinge area(s) 610 may be capable of electrical connectivity with an adjacent IMOD 500 and/or with a routing area. According to some implementations, the sheet resistance of these hinge materials made of non-metal conductors or semiconductors may be no more than 100 kOhm/Sq. Accordingly, the mirror stack 505 may be capable of being actuated via electrical signals received by the metal layer 615 via the hinge area(s) 610.

As shown in FIG. 6B, the absorber stack 510 and the mirror stack 505 define a gap 530 therebetween. In this example the mirror stack 505 is capable of being positioned in a plurality of positions relative to the absorber stack 510, to form a plurality of gap heights 530. In this example, the IMOD 500 is an SMI that is capable of producing a plurality of reflective colors, including but not limited to red, green, blue, yellow, cyan, magenta, black and white. Accordingly, the plurality of reflective colors may include more than two colors in some implementations. Each reflective color corresponds with a gap height of the plurality of gap heights. In this example, the mirror stack 505 is movable relative to the hinge area(s) 610 and the absorber stack 510. For example, the mirror stack 505 may be pulled towards the absorber stack 510, causing the hinge area(s) 610 to flex and/or rotate and changing the relative positions of the mirror stack 505 and the hinge area(s) 610. However, in alternative implementations the absorber stack 510 may be movable relative to the mirror stack 505.

FIG. 7 shows an example of a top view of an IMOD such as that of FIG. 6B. The line labeled "6B" indicates that in one example, the elements of FIG. 6B could be viewed if one made a cross-section through the structure shown in FIG. 7 along this line. In this example, the hinge area 610 is a continuous area disposed on the periphery of the mirror stack 510. Anchor areas 605a-605b correspond with the positions of anchors 18a-18d. In this example, the hinge area 610 completely covers, and extends beyond, the anchor areas 605a-605d. Alternative implementations may have more or fewer anchor areas 605 and corresponding anchors 18.

FIG. 8 shows an example of a top view of an alternative IMOD configuration. In this example, the hinge area 610 includes discrete hinge areas 610a-610d, each of which extends over only a portion of a corresponding instance of the anchor areas 605a-605d. Here, each one of the hinge areas 610a-610d is attached to a corresponding one of the portions 805a-805d of the mirror stack 505. In this example, one of the slots 810a-810d separates each of the hinge areas 610a-610d from a corresponding one of the portions 815a-815d of the mirror stack 505. In another example, the hinges can be made hidden behind the mirror so as to increase the mirror fill factor.

FIG. 9 shows an example of a cross-section through portions of a hinge area and a mirror stack. In this example, some layers of the mirror stack 505 extend through the hinge area 610. For example, the core layer 905 is thinner in the hinge area 610, but the core layer 905 extends through both the hinge area 610 and the mirror stack 505. The core layer 905 may include one or more dielectric materials, such as $SiO_2$, SiON, etc. However, alternative implementations may not include the core layer 905.

In this implementation, the mirror stack 505 includes non-metal conductor layers 920a and 920b on opposite sides of the core layer 905. The non-metal conductor layers 920a and 920b may, for example, include indium tin oxide, tantalum nitride, tantalum oxide, titanium oxide, titanium oxynitride and/or zirconium oxide. In some implementations, these layers may have properties such as tunable low stress, amorphous or fine grain structures, being thermally stable in terms of both mechanical and electrical performances, process compatibility with existing IMOD and TFT, or general semiconductor processes. Although the stack shown in FIG. 9 appears to be structurally symmetrical with reference to the core layer 905 (for example, the thicknesses of the dielectric layer 910a and the dielectric layer 910b appear to be the same and these layers may be made of the same material), some implementations do not have such structural symmetry. For example, in some implementations, the dielectric layer 910a and the dielectric layer 910b may not have the same thickness. However, some alternative implementations may nonetheless have functional symmetry, e.g., in terms of stiffness, thermal expansion and/or other properties.

In this example, the mirror stack 505 includes metal layers 615a and 615b disposed proximate, and capable of electrical communication with, the non-metal conductor layers 920a and 920b. The metal layer 615a is disposed proximate a first side of the mirror stack 505 and the metal layer 615b is disposed proximate a second side of the mirror stack 505. The metal layers 615a and 615b may, for example, include AlCu, Al, AlNd, AlSc, AlZr, silver, etc.

In some examples, as here, one or more dielectric layers may be disposed on the metal layer or layers of a mirror stack 505. Such dielectric layers may include $TiO_2$, $Si_3N_4$, $ZrO_2$, $Ta_2O_5$, $Sb_2O_3$, $HfO_2$, $Sc_2O_3$, $In_2O_3$, $Sn:In_2O_3$, $SiO_2$, SiON, $MgF_2$, $Al_2O_3$, $HfF_4$, $YbF_3$, $Na_3AlF_6$ and/or other dielectric materials. In this implementation, the dielectric layer 910a is disposed on the metal layer 615a and the metal layer 615b is disposed on the dielectric layer 910b. In this example, the dielectric layers 910a and 910b are formed of the same material and have equal thicknesses, or substantially equal thicknesses.

Here, the dielectric layer 915a is disposed on the dielectric layer 910a and the dielectric layer 910b is disposed on the dielectric layer 915b. In this implementation, dielectric layers 915a and 915b are formed of the same material and have equal thicknesses, or substantially equal thicknesses. In this example, the index of refraction of the dielectric layers 910a and 910b is lower than the index of refraction of the dielectric layers 915a and 915b.

Figure 10:
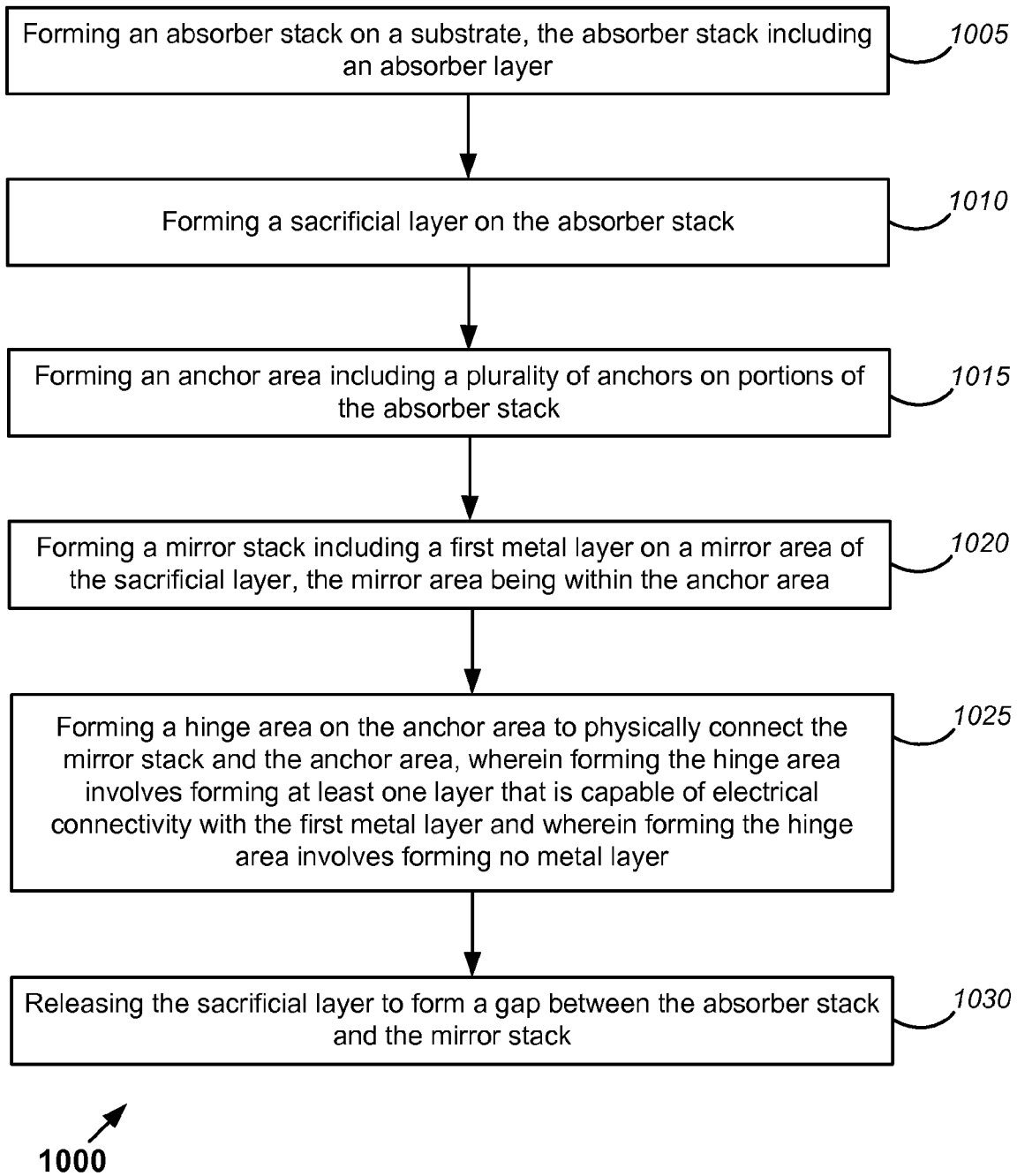
FIG. 10 is a flow diagram that outlines an example of a process of fabricating an IMOD.

FIG. 10 is a flow diagram that outlines an example of a process of fabricating an IMOD. The operations of method 1000 are not necessarily performed in the order shown in FIG. 10. Moreover, method 1000 may involve more or fewer blocks than are shown in FIG. 10. In this example, the method 1000 begins with block 1005, which involves forming an absorber stack, including an absorber layer, on a substrate. The substrate may be a transparent or substantially transparent substrate. The absorber stack may, for example, be similar to the absorber stack 510 described. The absorber layer may be both optically absorptive and electrically conductive. In some implementations, the absorber layer may include Cr, W, Ni, V, Ti, Rh, Pt, Ge, Co and/or MoCr. The absorber layer and/or other portions of the absorber stack may be patterned into parallel strips, and may form row or column electrodes in a display device. Such patterning can be performed by a masking and etching process or other suitable processes known in the art. In some implementations, block 1005 may involve forming one or more dielectric layers.

In this example, block 1010 involves forming a sacrificial layer on the absorber stack. In some implementations, forming the sacrificial layer may involve deposition of a xenon difluoride ($XeF_2$)-etchable material such as molybdenum (Mo) or amorphous silicon (a-Si), in a thickness selected to provide, after subsequent removal, a suitable gap between the absorber stack and a later-formed mirror stack. In some alternative implementations, this sacrificial layer may include one or more organic materials such as such Polyimide, photo resist, benzocyclobutene (BCB), etc., which can be removed with $O_2$ plasma. Block 1010 may involve deposition techniques such as physical vapor deposition (PVD), sputtering, plasma-enhanced chemical vapor deposition (PECVD), thermal chemical vapor deposition (thermal CVD), spin-coating or slit-coating for polymers etc. In some other implementations, the sacrificial layer may be an organic material that can be removed by $O_2$ plasma ashing. The choice of the sacrificial layer and its removal method may be dependent on the compatibility with the materials used in the IMOD structure and can be chosen accordingly.

Here, block 1015 involves forming an anchor area, including a plurality of anchors, on portions of the absorber stack. In some implementations, as shown in FIGS. 7 and 8, the anchor area may include a plurality of sub-areas, each of which corresponds with an anchor. Block 1015 may involve patterning the sacrificial layer to form anchor apertures, then depositing anchor material (such as a polymer, a dielectric material, etc.) into the anchor apertures to form the anchors, using a deposition method such as PVD, PECVD, thermal CVD, or spin-coating. In some implementations, the anchor apertures may extend through the sacrificial layer to the absorber stack. In alternative implementations, the anchor apertures may extend through both the sacrificial layer and the absorber stack to the underlying substrate. The patterning of the sacrificial layer and/or the anchors may be performed by a masking and etching process, but also may be performed by alternative patterning methods.

In this implementation, block 1020 involves forming a mirror stack having a first metal layer on a mirror stack area of the sacrificial layer. In this example, the mirror stack area is within the anchor area, e.g., as shown in FIGS. 7 and 8. In some implementations, forming the mirror stack may include forming the layers shown in the mirror stack 505 of FIG. 9, which may become a substantial part of the hinge area. Alternative implementations of block 1020 may involve forming different mirror stacks.

In this example, block 1025 involves forming a hinge area on the anchor area to physically connect the mirror stack and the anchor area. Depending on the particular implementation, block 1025 may involve forming a contiguous hinge area in an IMOD (e.g., as shown in FIG. 7) or forming separate hinge sub-areas in the IMOD (e.g., as shown in FIG. 8). Here, forming the hinge area involves forming at least one layer that is capable of electrical connectivity with the first metal layer of the mirror stack. In this implementation, however, forming the hinge area involves forming no metal layer in the hinge area. Accordingly, in some implementations block 1025 may involve forming a non-metal conductor such as one or more dielectrics, semiconductors and/or carbon. The dielectrics may include one or more metal oxides or metal oxynitrides, such as indium tin oxide, tantalum nitride, tantalum oxide, titanium oxide, titanium oxynitride and/or zirconium oxide.

According to some implementations, one or more layers of the mirror stack may extend through the hinge area. For example, as shown in FIG. 9, the core layer 905 is thinner in the hinge area 610, but the core layer 905 extends through both the hinge area 610 and the mirror stack 505. The non-metal conductor layer(s) of the hinge area may extend through, or at least extend into, the mirror stack in order to provide electrical connectivity with the metal layer(s) of the mirror stack. Similarly, one or more dielectric layers may extend through both the hinge area and the mirror stack. Therefore, at least some processes of blocks 1020 and 1025 may be performed at the same time, or at substantially the same time.

In this example, block 1030 involves releasing the sacrificial layer to form a gap between the absorber stack and the mirror stack. Block 1030 may, for example, involve exposing the sacrificial material to an etchant. After the sacrificial layer is removed, the mirror stack 505 may be moveable. Accordingly, the absorber stack and the mirror stack may be capable of being positioned in a plurality of positions relative to one another, to form a plurality of gap heights. For example, the absorber stack and the mirror stack may be capable of being positioned in a plurality of positions relative to one another via movement of the mirror stack relative to the hinge area and/or the absorber stack. Each reflective color of a plurality of reflective colors of the IMOD may correspond with a gap height.

Figure 11:
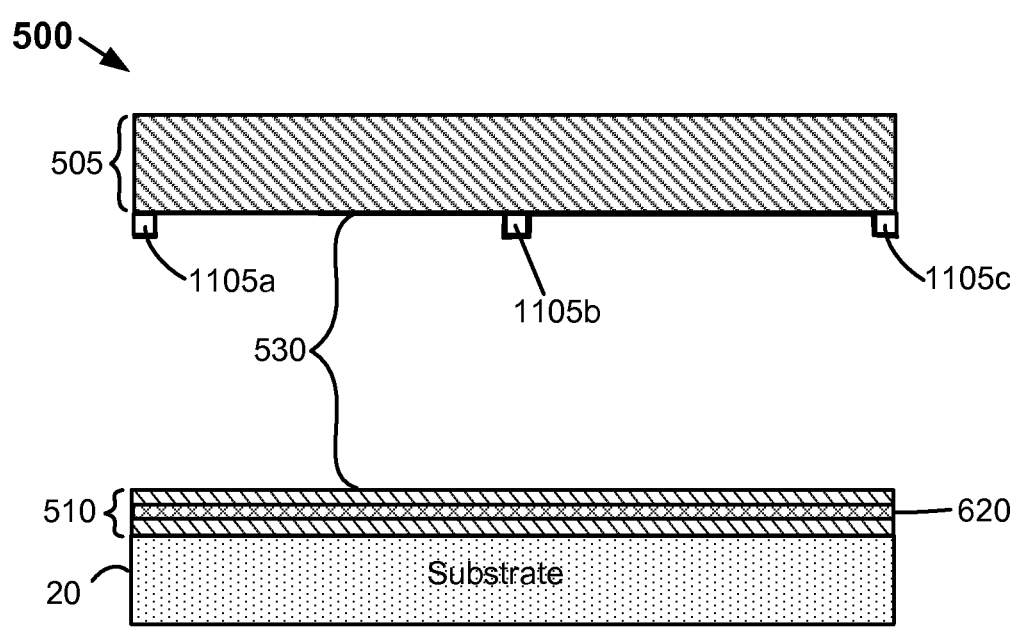
FIG. 11 shows an alternative implementation of a portion of an IMOD that includes protrusions for mitigating stiction.

FIG. 11 shows an alternative implementation of a portion of an IMOD that includes protrusions for mitigating stiction. The IMOD 500 of FIG. 11 may include hinge areas, etc., as described elsewhere herein. In this implementation, the IMOD 500 also includes protrusions 1105*a*-1105*c* disposed on the mirror stack 505. In this example, the protrusions are capable of preventing a large area of contact between areas of the mirror stack 505 and areas of the absorber stack 510. In some implementations, each of the protrusions 1105 may extend between 5 nm and 20 nm from the surface on which the protrusion 1105 is formed.

The size, number and arrangement of the protrusions 1105 of the implementations shown and described herein are merely made by way of example. Other implementations may have more or fewer of the protrusions 1105, may have at least some of the protrusions 1105 disposed on the absorber stack 510 or may not include the protrusions 1105 at all. However, including the protrusions 1105 may be advantageous, particularly for implementations in which at least some gap heights 530 (e.g., for a white state) may be small, e.g., on the order of 5 nm to 20 nm.

Figure 12A:
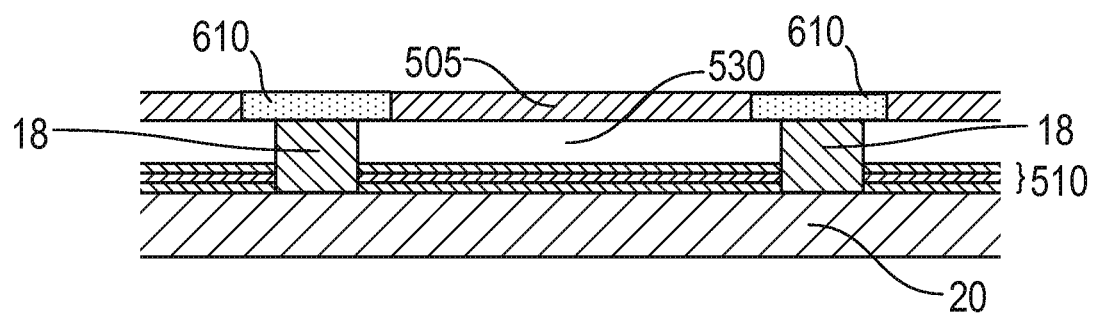
FIGS. 12A and 12B are cross-sections of additional examples of IMOD implementations.
Figure 12B:
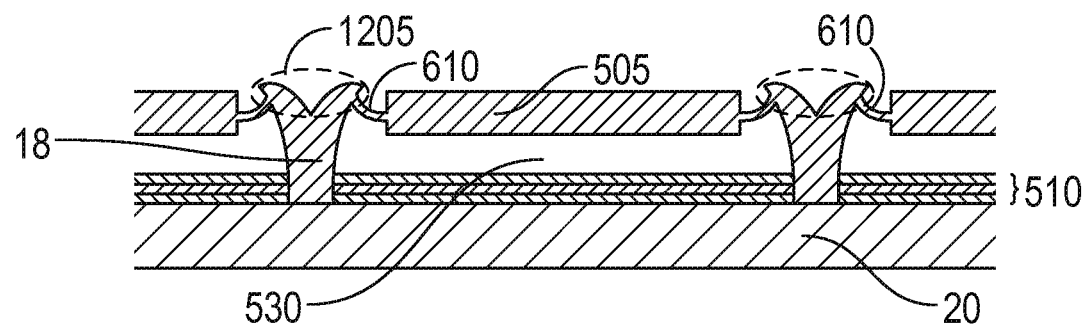

The details of the structure of IMOD displays and display elements may vary widely. FIGS. 12A and 12B are cross-sections of additional examples of IMOD implementations. FIG. 12A is a cross-sectional illustration of an IMOD having hinge areas 610 such as those described elsewhere herein. In this example, the hinge areas 610 extend across the anchors 18. In this example, the anchors 18 extend through the absorber layer 510 to the substrate 20. In some implementations, the absorber stack 510 may be patterned such that the absorber stack 510 of one pixel is not electrically connected with the absorber stack 510 of an adjacent pixel.

In FIG. 12B, the mirror stack 505 of each IMOD display element is generally square or rectangular in shape and is attached to the anchors 18 at or near the corners, via tether-shaped hinge areas 610. The hinge areas 610 are capable of electrical connectivity with at least one metal layer of the mirror stack 505 via a non-metal conductor, but the hinge areas 610 include no metal layer. In the example shown in FIG. 12B, the upper portions 1205 of the anchors 18 include a conductive material, which may be a conductive metal. In this implementation, the anchors 18 extend through the absorber layer 510 to the substrate 20.

Figure 12C:
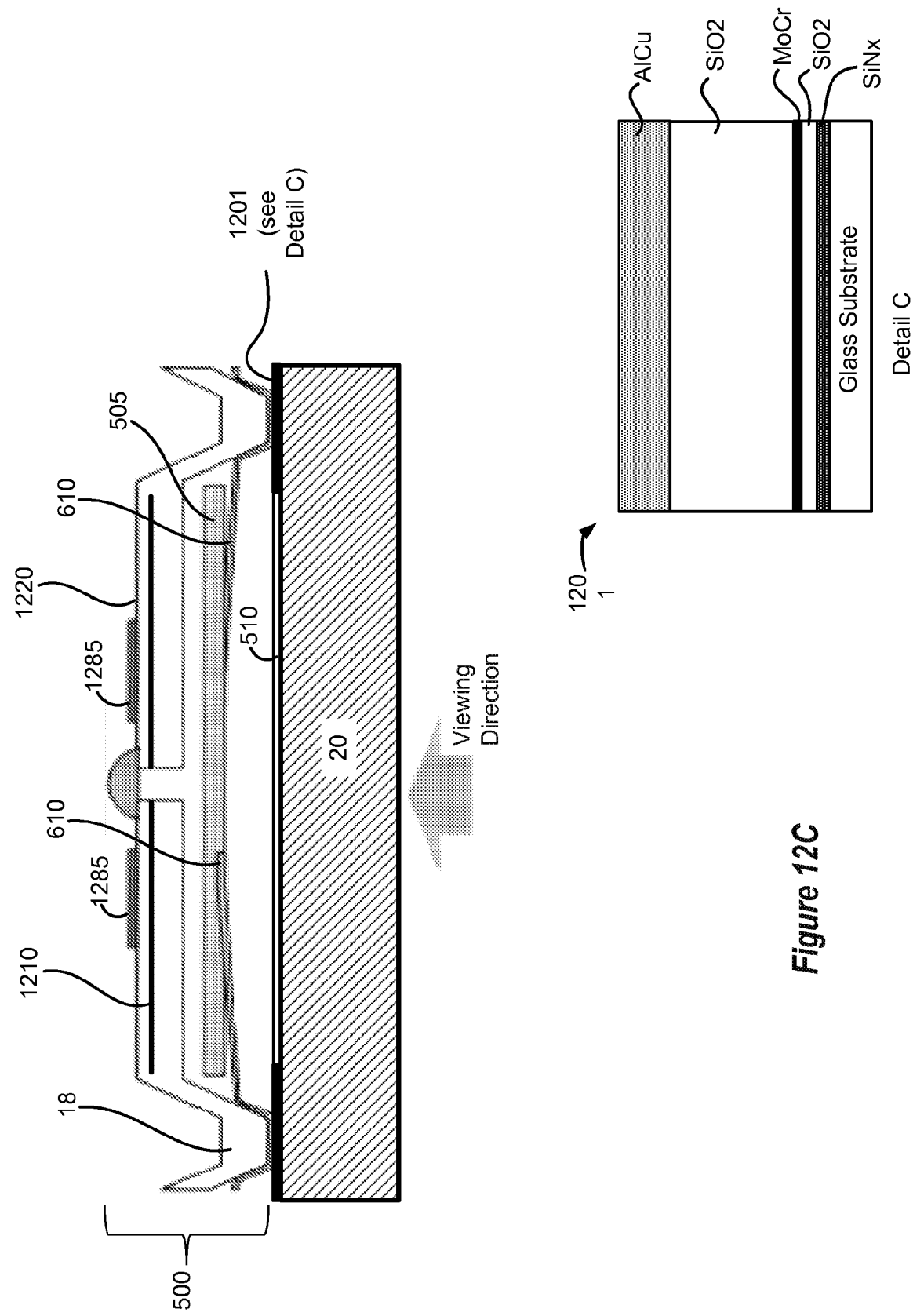
FIG. 12C illustrates a cross-section of an IMOD according to another implementation.

FIG. 12C illustrates a cross-section of an IMOD according to another implementation. In the illustrated implementation, an IMOD 500 includes a mirror stack 505 that may be capable of being disposed in a range of positions relative to the absorber stack 510 and the transparent substrate 20. In the implementation shown in FIG. 12C, the hinge areas 610 extend from the anchors 18 to sides of the mirror stack 505. Similar to the implementations described above, the hinge areas 610 have no metal layer, but are capable of electrically connecting a metal layer of the mirror stack 505 and the anchor area 18. In this example, the IMOD 500 includes an upper electrode 1210. In this implementation, the IMOD 500 is capable of pulling up the mirror stack 505 (moving the mirror stack 505 away from the absorber stack 510) by applying a voltage between the upper electrode 1210 and the mirror stack 505, as well as being capable of pulling down the mirror stack 505 (moving the mirror stack 505 towards the absorber stack 510) by applying a voltage between the mirror stack 505 and the absorber stack 510.

In this example, TFTs 1285 are located on the surface 1220. In some implementations, other components of an active matrix backplane, such as storage capacitors, may be located on the surface 1220.

In this example, a black mask (BM) stack 1201 is positioned between portions of the IMOD 500 and the transparent substrate 20. In cooperation with the mirror stack 505, the BM stack 1201 may prevent light, entering the transparent substrate 20 from the viewing direction, from reaching the TFTs 1285.

In the illustrated implementation, the BM stack 1201 is a multilayer arrangement of AlCu, $SiO_2$, MoCr and $SiN_x$, disposed on a glass substrate as illustrated in Detail C in FIG. 12C, but other implementations may include other materials and/or other arrangements of materials. In some implementations, a first layer, composed of $SiN_x$ and having a thickness in the range of about 10-50 nm, may be disposed on the glass substrate; a second layer, composed of $SiO_2$ and having a thickness in the range of about 5-30 nm, may be disposed on the first layer; a third layer, composed of MoCr and having a thickness in the range of about 3-20 nm, may be disposed on the second layer; a fourth layer, composed of $SiO_2$ and having a thickness in the range of about 30-150 nm, may be disposed on the third layer; and a fifth layer, composed of AlCu and having a thickness in the range of about 20-100 nm, may be disposed on the fourth layer.

In another implementation, the BM stack 1201 may be replaced with any high absorption material such as a black resin.

Figure 13A:
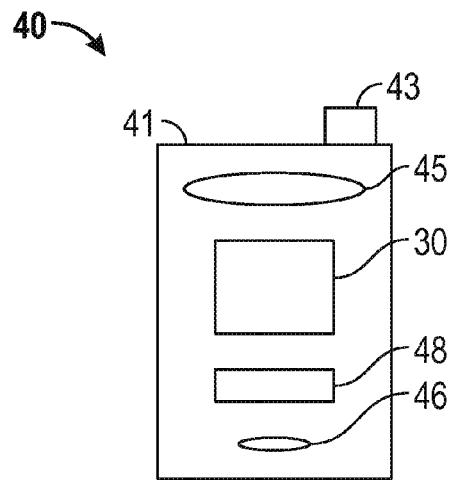
FIGS. 13A and 13B are system block diagrams illustrating a display device 40 that includes a plurality of IMOD display elements.
Figure 13B:
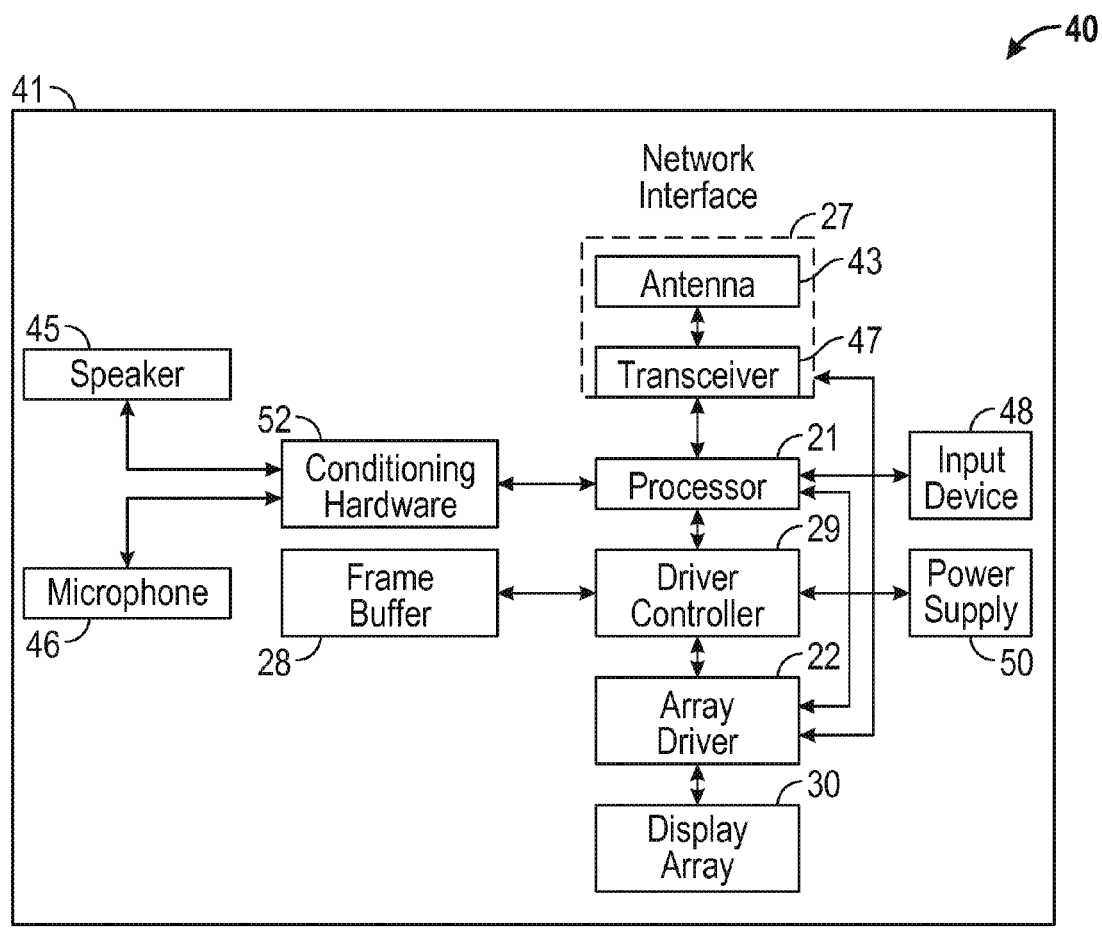

FIGS. 13A and 13B are system block diagrams that show examples of display device components. The display device 40 can be, for example, a smart phone, a cellular or mobile telephone. However, the same components of the display device 40 or slight variations thereof are also illustrative of various types of display devices such as televisions, computers, tablets, e-readers, hand-held devices and portable media devices.

The display device 40 includes a housing 41, a display 30, an antenna 43, a speaker 45, an input device 48 and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. In some implementations, the display 30 includes IMOD display elements, such as the IMODs 500 as described elsewhere herein. The display 30 also can be configured to include a flat-panel display, such as plasma, EL, OLED, STN LCD, or TFT LCD, or a non-flat-panel display, such as a CRT or other tube device. In addition, the display 30 can include an IMOD-based display. The display may include IMODs such as those described herein.

The components of the display device 40 are schematically illustrated in FIG. 13A. The display device 40 includes a housing 41 and can include additional components at least partially enclosed therein. For example, the display device 40 includes a network interface 27 that includes an antenna 43 which can be coupled to a transceiver 47. The network interface 27 may be a source for image data that could be displayed on the display device 40. Accordingly, the network interface 27 is one example of an image source module, but the processor 21 and the input device 48 also may serve as an image source module. The transceiver 47 is connected to a processor 21, which is connected to conditioning hardware 52. The conditioning hardware 52 may be configured to condition a signal (such as filter or otherwise manipulate a signal). The conditioning hardware 52 can be connected to a speaker 45 and a microphone 46. The processor 21 also can be connected to an input device 48 and a driver controller 29. The driver controller 29 can be coupled to a frame buffer 28, and to an array driver 22, which in turn can be coupled to a display array 30. One or more elements in the display device 40, including elements not specifically depicted in FIG. 13A, can be configured to function as a memory device and be configured to communicate with the processor 21. In some implementations, a power supply 50 can provide power to substantially all components in the particular display device 40 design.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 43 transmits and receives RF signals according to the Bluetooth® standard. In the case of a cellular telephone, the antenna 43 can be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 4G or 5G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that can be readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of display elements.

In some implementations, the driver controller 29, the array driver 22, and the display array 30 are appropriate for any of the types of displays described herein. For example, the driver controller 29 can be a conventional display controller or a bi-stable display controller (such as an IMOD display element controller). Additionally, the array driver 22 can be a conventional driver or a bi-stable display driver (such as an IMOD display element driver). Moreover, the display array 30 can be a conventional display array or a bi-stable display array (such as a display including an array of IMOD display elements). In some implementations, the driver controller 29 can be integrated with the array driver 22. Such an implementation can be useful in highly integrated systems, for example, mobile phones, portable-electronic devices, watches or small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, a touch-sensitive screen integrated with the display array 30, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices. For example, the power supply 50 can be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of, e.g., an IMOD display element as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, a person having ordinary skill in the art will readily recognize that such operations need not be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An interferometric modulator (IMOD), comprising:
a mirror stack including a first metal layer;
a substrate formed of substantially transparent material;
an absorber stack disposed on the substrate, the absorber stack including an absorber layer;
an anchor area including a plurality of anchors; and
a hinge area including at least one non-metal conductor, the hinge area having no metal layer, the hinge area attached to and physically connecting the mirror stack and the anchor area, the hinge area being configured for electrical connectivity with the first metal layer, wherein
the absorber stack and the mirror stack define a gap therebetween and are configured for being positioned in a plurality of positions relative to one another, to form a plurality of gap heights; and
each reflective color of a plurality of reflective colors of the IMOD corresponds with a gap height of the plurality of gap heights.

2. The IMOD of claim 1, wherein the hinge area includes at least one material selected from a list of materials consisting of metal oxides and metal nitrides.

3. The IMOD of claim 1, wherein the at least one non-metal conductor is selected from a list of non-metal conductors consisting of carbon, indium tin oxide, tantalum nitride, tantalum oxide, titanium oxide, titanium oxynitride and zirconium oxide.

4. The IMOD of claim 1, wherein the plurality of reflective colors includes more than two colors.

5. The IMOD of claim 1, wherein the mirror stack is configured for being actuated via electrical signals received by the first metal layer via the hinge area.

6. The IMOD of claim 1, wherein the mirror stack further comprises:
a first dielectric layer proximate the first metal layer, the first dielectric layer having a first index of refraction; and
a second dielectric layer proximate the first dielectric layer, the second dielectric layer having a second index of refraction that is higher than the first index of refraction.

7. The IMOD of claim 6, wherein the first metal layer is disposed proximate a first side of the mirror stack and wherein the mirror stack further comprises:
a second metal layer disposed proximate a second side of the mirror stack;
a third dielectric layer proximate the second metal layer, the third dielectric layer being formed of the same material as, and having a thickness substantially equal to that of, the first dielectric layer; and
a fourth dielectric layer proximate the third dielectric layer, the fourth dielectric layer being formed of the same material as, and having a thickness substantially equal to that of, the second dielectric layer.

8. The IMOD of claim 1, further comprising a plurality of protrusions disposed on at least one of the absorber stack or the mirror stack, the protrusions being configured for preventing contact between areas of the mirror and areas of the absorber stack.

9. The IMOD of claim 8, wherein each of the protrusions extends between 5 and 20 nm from the surface on which the protrusion is formed.

10. A display device that includes the IMOD of claim 1, wherein the display device includes a control system configured for controlling each pixel of the display device independently and wherein the control system is configured for processing image data.

11. The display device of claim 10, wherein the control system further comprises:
a plurality of thin-film transistor (TFT) switches, each of the plurality of TFT switches corresponding to an individual pixel of the display device.

12. The display device of claim 10, wherein the control system further comprises:
an image source module configured for sending the image data to the processor, wherein the image source module includes at least one of a receiver, transceiver, and transmitter.

13. The display device of claim 10, further comprising:
an input device configured for receiving input data and of communicating the input data to the control system.

14. The IMOD of claim 1, further comprising:
an electrode; and
a control system configured for moving the mirror stack away from the absorber stack by applying a voltage between the electrode and the mirror stack.

15. An interferometric modulator (IMOD), comprising:
a mirror stack including a first metal layer;
a substrate formed of substantially transparent material;
an absorber stack disposed on the substrate, the absorber stack including an absorber layer, the absorber stack and the mirror stack defining a gap therebetween;
an anchor area including a plurality of anchors;
a hinge area including at least one non-metal conductor, the hinge area having no metal layer, the hinge area attached to and physically connecting the mirror stack and the anchor area, the hinge area being configured for electrical connectivity with the first metal layer; and
means for positioning the mirror stack in a plurality of positions relative to the absorber stack to form a plurality of gap heights, each reflective color of a plurality of reflective colors of the IMOD corresponding with a gap height of the plurality of gap heights.

16. The IMOD of claim 15, wherein the positioning means includes means for actuating the mirror stack by providing electrical signals to the first metal layer via the hinge area.

17. The IMOD of claim 16, wherein the hinge area is configured for electrical connectivity with a routing area and wherein the positioning means includes means for providing the electrical signals via the routing area.

18. The IMOD of claim 15, wherein the hinge area includes at least one non-metal conductor selected from a list of non-metal conductors consisting of carbon, indium tin oxide, tantalum nitride, tantalum oxide, titanium oxide, titanium oxynitride and zirconium oxide.

19. The IMOD of claim 15, wherein the hinge area includes at least one non-metal conductor selected from a list of non-metal conductors consisting of dielectrics, semiconductors and carbon.

20. The IMOD of claim 15, wherein the plurality of reflective colors includes more than two colors.

21. The IMOD of claim 15, further comprising an electrode, wherein the means for positioning the mirror stack includes means for moving the mirror stack away from the absorber stack by applying a voltage between the electrode and the mirror stack.

22. A method of forming an interferometric modulator (IMOD), the method comprising:
    forming an absorber stack on a substrate, the absorber stack including an absorber layer;
    forming a sacrificial layer on the absorber stack;
    forming an anchor area including a plurality of anchors on portions of the absorber stack;
    forming a mirror stack including a first metal layer on a mirror stack area of the sacrificial layer, the mirror stack area being within the anchor area;
    forming a hinge area on the anchor area to attach and physically connect the mirror stack and the anchor area, wherein forming the hinge area involves forming at least one layer that includes a non-metal conductor configured for electrical connectivity with the first metal layer and wherein forming the hinge area involves forming no metal layer; and
    releasing the sacrificial layer to form a gap between the absorber stack and the mirror stack.

23. The method of claim 22, further comprising configuring the absorber stack and the mirror stack to be configured for being positioned in a plurality of positions relative to one another, to form a plurality of gap heights, each reflective color of a plurality of reflective colors of the IMOD corresponding with a gap height of the plurality of gap heights.

24. The method of claim 23, wherein the configuring process involves configuring the absorber stack and the mirror stack to be configured for being positioned in a plurality of positions relative to one another via movement of the mirror stack relative to the hinge area.

25. The method of claim 22, wherein forming the hinge area involves depositing at least one material selected from a list of materials consisting of dielectrics, semiconductors and carbon.

26. The method of claim 22, wherein the at least one non-metal conductor is selected from a list of non-metal conductors consisting of carbon, indium tin oxide, tantalum nitride, tantalum oxide, titanium oxide, titanium oxynitride and zirconium oxide.

* * * * *